United States Patent
Jia

(10) Patent No.: US 11,940,611 B2
(45) Date of Patent: Mar. 26, 2024

(54) TOMOGRAPHIC IMAGING SYSTEMS AND METHODS

(71) Applicant: Georgia Tech Research Corporation, Atlanta, GA (US)

(72) Inventor: Shu Jia, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 17/908,270

(22) PCT Filed: Mar. 8, 2021

(86) PCT No.: PCT/US2021/021330
§ 371 (c)(1),
(2) Date: Aug. 31, 2022

(87) PCT Pub. No.: WO2021/178950
PCT Pub. Date: Sep. 10, 2021

(65) Prior Publication Data
US 2023/0118427 A1    Apr. 20, 2023

Related U.S. Application Data

(60) Provisional application No. 62/986,031, filed on Mar. 6, 2020.

(51) Int. Cl.
*G02B 21/36*    (2006.01)
*G02B 27/58*    (2006.01)

(52) U.S. Cl.
CPC .......... *G02B 21/365* (2013.01); *G02B 27/58* (2013.01)

(58) Field of Classification Search
CPC .............................. G02B 21/365; G02B 21/58
See application file for complete search history.

(56) References Cited

U.S. PATENT DOCUMENTS

| | | |
|---|---|---|
| 2012/0257197 A1 | 10/2012 | Feldkhun et al. |
| 2012/0302862 A1 | 11/2012 | Yun et al. |
| 2015/0029325 A1 | 1/2015 | Dholakia et al. |
| 2017/0038574 A1 | 2/2017 | Zhuang et al. |
| 2019/0191979 A1 | 6/2019 | Roichman et al. |
| 2020/0408691 A1* | 12/2020 | Vladimirov ............ G02B 21/18 |

OTHER PUBLICATIONS

International Search Report and Written Opinion from Application No. PCT/US2021/021330 dated May 27, 2021.
Wang, et al., "Airy-Beam Tomographic Microscopy," 2020 Optica, vol. 7, issue 7, pp. 790-793.

* cited by examiner

*Primary Examiner* — Laura A Gudorf
(74) *Attorney, Agent, or Firm* — Troutman Pepper Hamilton Sanders LLP; Ryan A. Schneider; Chris N. Davis

(57) ABSTRACT

Disclosed herein are methods of tomographic imaging, the methods comprising emitting a beam of light from a light source to a sample and modulating the beam of light through a spatial light modulator configured to convert the beam of light to an Airy beam. The spatial light modulator can be rotatable and positioned at a first angle relative to the sample. The method can further obtain a first perspective view of the sample, rotate the spatial light modulator to a second angle relative to the sample, and obtain a second perspective view of the sample. Each of the perspective views can be generated by the Airy beam interacting with the sample on a focal plane. The method can then reconstruct a volumetric three-dimensional view of the sample using the first perspective view and the second perspective view.

29 Claims, 23 Drawing Sheets

TOMOGRAPHIC IMAGING SYSTEMS AND METHODS

CROSS-REFERENCE TO RELATED APPLICATIONS

This application claims the benefit of U.S. Provisional Application Ser. No. 62/986,031, filed on 6 Mar. 2020, the entire contents and substance of which is incorporated herein by reference in its entirety as if fully set forth below.

FIELD OF THE DISCLOSURE

The present disclosure relates generally to treated tomographic imaging systems and methods. Particularly, embodiments of the present disclosure relate to systems and methods for tomographic imaging using Airy beams.

BACKGROUND

The development of self-accelerating Airy beams can be of great importance to provide a resurgence of non-diffracting waves and similar research areas. Being an exact solution of the paraxial wave equation, Airy beams can propagate over many Rayleigh lengths without appreciable diffraction, can be self-healing after being obscured in scattering media, and can undergo lateral displacement as they propagate, resulting in a curved self-accelerating trajectory. These unique properties can provide many benefits in many areas of technological advancement, such as optical manipulation, laser filamentation, micro-machining, nonlinear optics, and the generation of varying non-diffracting waveforms, such as electron beams, plasmonic waves, acoustic waves, and quantum particles.

The unique properties of Airy beams can additionally provide a technological advantage in the field of optical imaging. Namely, amongst many applications, Airy beams can be employed in Airy-beam-enabled optical imaging, such as precise three-dimensional localization of single molecules in super-resolution microscopy and the enhanced field of view and image quality in light-sheet microscopy. However, the highly adjustable Airy trajectories fall short when used for analysis in the entire three-dimensional space for volumetric imaging of biological specimens.

What is needed, therefore, are systems and methods for employing Airy beams for tomographic imaging to aid in the analysis of three-dimensional space for volumetric imaging. Embodiments of the present disclosure address this need as well as other needs that will become apparent upon reading the description below in conjunction with the drawings.

BRIEF SUMMARY OF THE DISCLOSURE

The present disclosure relates generally to treated tomographic imaging systems and methods. Particularly, embodiments of the present disclosure relate to systems and methods for tomographic imaging using Airy beams.

An exemplary embodiment of the present disclosure can provide an imaging method comprising: emitting a beam of light from a light source to a sample; modulating the beam of light through a spatial light modulator configured to convert the beam of light to an Airy beam, the spatial light modulator being rotatable and positioned at a first angle relative to the sample; obtaining a first perspective view of the sample by a detector, the first perspective view being generated by the Airy beam interacting with the sample on a focal plane; rotating the spatial light modulator such that the spatial light modulator is positioned at a second angle relative to the sample; obtaining a second perspective view of the sample by the detector, the second perspective view being generated by the Airy beam interacting with the sample on the focal plane; and reconstructing a volumetric three-dimensional view of the sample using the first perspective view and the second perspective view.

In any of the embodiments disclosed herein, the modulating can comprise: applying a Fourier transform to the beam of light, wherein the beam of light is in the form of a Gaussian beam; and modulating the Fourier transform by a cubic spatial phase.

In any of the embodiments disclosed herein, the Fourier transform can have the form $A_0 \exp[-(k_x^2+k_y^2)/w_0]$, where $w_0$ and $A_0$ are scale factors, and $(x, y)$ and $(k_x, k_y)$ are the spatial coordinates and the corresponding spatial-frequency components, respectively.

In any of the embodiments disclosed herein, the cubic spatial phase can have the form $(k_x/b_0)^3+(k_y/b_0)^3$, where $b_0$ is a scale factor, and $(x, y)$ and $(k_x, k_y)$ are the spatial coordinates and the corresponding spatial-frequency components, respectively.

In any of the embodiments disclosed herein, the Airy beam can be a two-dimensional exponentially truncated Airy function having the form $Ai(x/a_0, y/a_0)$, where $a_0$ is a scale factor, and $(x, y)$ are the spatial coordinates.

In any of the embodiments disclosed herein, the reconstructing can comprise deconvolving each of the first perspective image and the second perspective image using a corresponding Airy point-spread function for each.

In any of the embodiments disclosed herein, the spatial light modulator can comprise: a spatial filter configured to suppress Airy side lobes of the Airy beam; and a phase chirp configured to elongate an accelerating trajectory of the Airy beam such that the Airy beam is asymmetrical above and below the focal plane.

In any of the embodiments disclosed herein, the phase chirp can have the form $\exp(-ik_z \cdot z_0)$, where $k_z=(k_x^2+k_y^2)/(2k)$, and $z_0$ is empirically set to control a ballistic trajectory of the Airy beam.

In any of the embodiments disclosed herein $z_0$ can be from approximately 1 μm to approximately 10 μm.

In any of the embodiments disclosed herein, the Airy beam can be an Airy main lobe on the focal plane, the Airy main lobe described as the form:

$$\begin{bmatrix} x_c \\ y_c \end{bmatrix} = \begin{bmatrix} 1 & 0 & A\cos(\Delta\varphi) \\ 0 & 1 & A\sin(\Delta\varphi) \end{bmatrix} \begin{bmatrix} x' \\ y' \\ z'^2 \end{bmatrix},$$

wherein $(x', y', z')$ and $(x_c, y_c)$ represent the coordinates of the light source in a space relative to the sample and a space relative to the detector, and $\Delta\varphi$ represents a difference between the first angle and the second angle.

Another embodiment of the present disclosure can provide a system for tomographic imaging, the system comprising: a light source configured to emit light from the light source to a sample; a spatial light modulator being rotatable and positioned at a first angle relative to the sample, the spatial light modulator configured to convert the beam of light to an Airy beam, the spatial light modulator being rotatable and positioned at a first angle relative to the sample; a detector configured to obtain a first perspective view of the sample generated by the Airy beam interacting with the sample on a focal plane; and a controller configured to (i) rotatably articulate the spatial light modulator such that the spatial light modulator is positioned at a second angle relative to the sample and (ii) reconstruct a volumetric three-dimensional view of the sample using the first perspective view.

In any of the embodiments disclosed herein, the detector can be further configured to, responsive to the controller rotatably articulating the spatial light modulator to the second angle, obtain a second perspective view of the sample generated by the Airy beam interacting with the sample on the focal plane.

In any of the embodiments disclosed herein, the controller can be further configured to reconstruct the volumetric three-dimensional view of the sample using the second perspective view in addition to the first perspective view.

In any of the embodiments disclosed herein, the spatial light modulator can be configured to: (i) apply a Fourier transform to the beam of light, wherein the beam of light is in the form of a Gaussian beam, and (ii) modulate the Fourier transform by a cubic spatial phase.

In any of the embodiments disclosed herein, the controller can be further configured to deconvolve each of the first perspective image and the second perspective image using a corresponding Airy point-spread function for each.

In any of the embodiments disclosed herein, the Fourier transform can have the form $A_0 \exp[-(k_x^2+k_y^2)/w_0]$, where $w_0$ and $A_0$ are scale factors, and (x, y) and ($k_x$, $k_y$) are the spatial coordinates and the corresponding spatial-frequency components, respectively.

In any of the embodiments disclosed herein, the cubic spatial phase can have the form $(k_x/b_0)^3+(k_y/b_0)^3$, where $b_0$ is a scale factor, and (x, y) and ($k_x$, $k_y$) are the spatial coordinates and the corresponding spatial-frequency components, respectively.

In any of the embodiments disclosed herein, the Airy beam can be a two-dimensional exponentially truncated Airy function having the form $Ai(x/a_0, y/a_0)$, where $a_0$ is a scale factor, and (x, y) are the spatial coordinates.

In any of the embodiments disclosed herein, the reconstructing can comprise deconvolving each of the first perspective image and the second perspective image using a corresponding Airy point-spread function for each.

In any of the embodiments disclosed herein, the spatial light modulator can comprise: a spatial filter configured to suppress Airy side lobes of the Airy beam; and a phase chirp configured to elongate an accelerating trajectory of the Airy beam such that the Airy beam is asymmetrical above and below the focal plane.

In any of the embodiments disclosed herein, the phase chirp can have the form $\exp(-ik_z \cdot z_0)$, where $k_z=(k_x^2+k_y^2)/(2k)$, and $z_0$ is empirically set to control a ballistic trajectory of the Airy beam.

In any of the embodiments disclosed herein $z_0$ can be from approximately 1 µm to approximately 10 µm.

In any of the embodiments disclosed herein, the Airy beam can be an Airy main lobe on the focal plane, the Airy main lobe described as the form:

$$\begin{bmatrix} x_c \\ y_c \end{bmatrix} = \begin{bmatrix} 1 & 0 & A\cos(\Delta\varphi) \\ 0 & 1 & A\sin(\Delta\varphi) \end{bmatrix} \begin{bmatrix} x' \\ y' \\ z'^2 \end{bmatrix},$$

wherein (x', y', z') and ($x_c$, $y_c$) represent the coordinates of the light source in a space relative to the sample and a space relative to the detector, and $\Delta\varphi$ represents a difference between the first angle and the second angle.

Another embodiment of the present disclosure can provide a system for tomographic imaging, the system comprising: a light source configured to emit a beam of light; a spatial light modulator being rotatable relative to the light source; a detector; a processor; and a memory storing instructions that, when executed by the processor, cause the system to execute one or more of the methods disclosed herein.

Another embodiment of the present disclosure can provide an imaging method comprising: modulating a beam of light through a spatial light modulator configured to convert the beam of light to an Airy beam, the spatial light modulator being rotatable and positioned at a first angle relative to a sample; obtaining a first perspective view of the sample by a detector, the first perspective view being generated by the Airy beam interacting with the sample on a focal plane; rotating the spatial light modulator such that the spatial light modulator is positioned at a second angle relative to the sample; obtaining a second perspective view of the sample by the detector, the second perspective view being generated by the Airy beam interacting with the sample on the focal plane; rotating the coordinates of a plane of the detector such that the plane is orthogonal with respect to each of the first perspective view and the second perspective view; performing a linear backpropagation on the rotated coordinates of the plane of the detector to obtain linear-backprojected space coordinates; and transforming the linear-backprojected space coordinates to an original space containing the sample.

In any of the embodiments disclosed herein, the rotating can be defined by the relationship:

$$\begin{bmatrix} x_\perp \\ y_\perp \\ z_\perp \end{bmatrix} = A_{\varphi,\theta} \begin{bmatrix} x_c \\ y_c \\ z_c \end{bmatrix} = \begin{bmatrix} 1 & 0 & 0 \\ 0 & \cos\theta & \sin\theta \\ 0 & -\sin\theta & \cos\theta \end{bmatrix} \begin{bmatrix} \cos\varphi & \sin\varphi & 0 \\ -\sin\varphi & \cos\varphi & 0 \\ 0 & 0 & 1 \end{bmatrix} \begin{bmatrix} x_c \\ y_c \\ z_c \end{bmatrix}$$

where $\varphi$ is the azimuthal orientation (at an integer number n of the step size of 4, i.e. $\varphi=n\cdot\Delta\varphi$, where $n \in \{0, 2\pi/\Delta\varphi-1\}$) of each perspective image on the plane of the detector, and $\theta$ represents the inclination angle with respect to the z axis.

In any of the embodiments disclosed herein, the linear backpropagation can comprise a parallel beam geometry and an iterative linear solver.

In any of the embodiments disclosed herein, the transforming the linear-backprojected space coordinates can follow the form:

$$x = \frac{1}{M} x' = \frac{1}{M} x_{T'}$$

$$y = \frac{1}{M} y' = \frac{1}{M} y_{T'}$$

$$z = \frac{1}{M^2} z' = \frac{1}{M^2} (2\sqrt{2} k^2 x_0^3 z_T \tan\theta)^{1/2}$$

where M is the magnification of the imaging system.

These and other aspects of the present disclosure are described in the Detailed Description below and the accompanying figures. Other aspects and features of embodiments of the present disclosure will become apparent to those of ordinary skill in the art upon reviewing the following description of specific, exemplary embodiments of the present invention in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
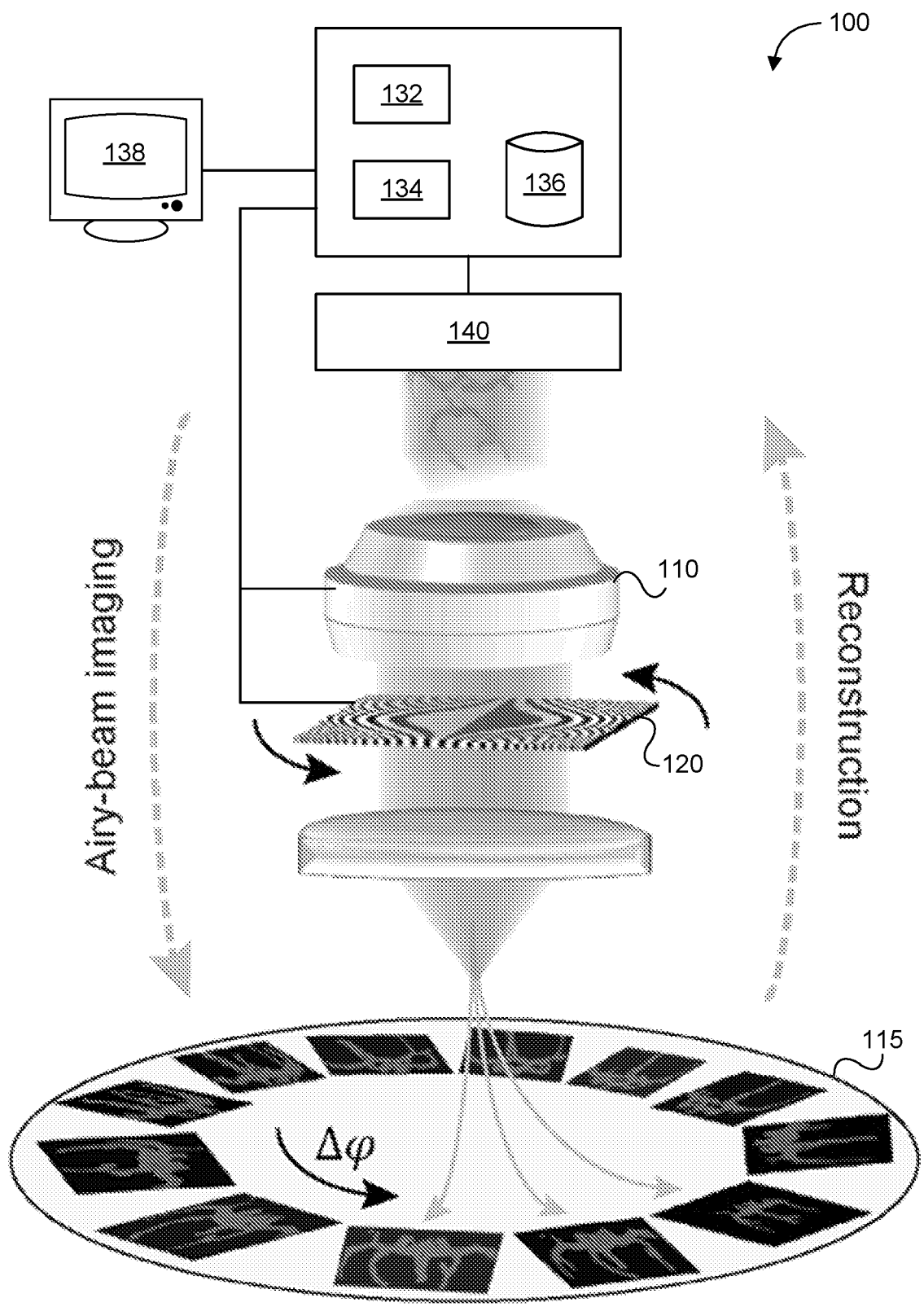
FIG. 1 illustrates a component diagram of a system for tomographic imaging in accordance with some embodiments of the present disclosure.

As stated above, a problem with current tomographic imaging is the highly adjustable Airy trajectories fall short when used for analysis in the entire three-dimensional space for volumetric imaging of biological specimens. Harnessing the unique properties of Airy beams can greatly improve the three-dimensional imaging capabilities of such systems and greatly expand the design space of many technological fields.

Disclosed herein are systems and methods for Airy-beam tomographic microscopy (ATM), an approach that allows for mechanical-scanning-free, volumetric three-dimensional (3D) cell and tissue imaging using non-diffracting, self-accelerating Airy beams. Conventional wide-field imaging techniques are telecentric, which produce orthographic views and thereby need to acquire the 3D information in a scanning fashion. Such systems often require movement of the beam source and/or the imaging detector, often needing to image the sample on a layer-by-layer basis.

In contrast, the self-accelerating propagation trajectory of an Airy beam can innately form a perspective view of the object. Therefore, given sufficient perspective views by manipulating the Airy beam trajectories, the entire volume can be computationally synthesized in a tomographic manner. Such an imaging scheme can utilize the self-acceleration and maneuverability of Airy beams, circumventing the need for sample or focal-plane scanning as in many conventional wide-field systems. Furthermore, the non-diffraction of Airy beams can effectively mitigate the trade-off between the axial Rayleigh length (i.e. the depth of focus (DOF)) and the lateral beam diffraction, thus offering a depth-invariant resolution across a substantially improved DOF.

In practice, each Airy beam (e.g., a 2D exponentially truncated Airy function $Ai(x/a_0, y/a_0)$) can be generated by the Fourier transform of a Gaussian beam $A_0 \exp[-(k_x^2+k_y^2)/w_0]$ modulated by a cubic spatial phase $(k_x/b_0)^3 (k_y/b_0)^3$, where $a_0$, $b_0$, $w_0$ and $A_0$ are scale factors, and $(x, y)$ and $(k_x, k_y)$ are the spatial coordinates and the corresponding spatial-frequency components, respectively. The disclosed systems and methods can utilize spatial light modulator (SLM) to implement the cubic phase at the Fourier plane of the detection path of an imaging device, such as a wide-field microscope. The use of the SLM can allow for adjusting the scale factor $b_0$ to control the cubic phase and thus determine the self-accelerating property of the Airy beams.

Using the coherent model, the curved trajectory of an Airy main lobe can be described as $$\Delta l' = A z'^2 = \frac{1}{2\sqrt{2} k^2 x_0'^3} z'^2,$$

where $\Delta l'$ and $z'$ are the lateral displacement and the axial propagation distance, respectively, both in the image space, $A$ is the acceleration coefficient, $k=2\pi/\lambda$ is the wavenumber, and $x'_0$ is the lateral size of the main lobe.

By rotating the phase mask by azimuthal angles of $\Delta\varphi$ on the SLM, the disclosed systems and methods can be able to steer Airy beams into various accelerating orientations, thus generating views of the object from a full set of perspectives. In this case, using the above equation, the correspondence between the accelerating trajectory of the Airy main lobe at the intermediate image plane and its projection on the camera plane can be described as:

$$\begin{bmatrix} x_c \\ y_c \end{bmatrix} = \begin{bmatrix} 1 & 0 & A\cos(\Delta\varphi) \\ 0 & 1 & A\sin(\Delta\varphi) \end{bmatrix} \begin{bmatrix} x' \\ y' \\ z'^2 \end{bmatrix},$$

where (x', y', z') and ($x_c$, $y_c$) represent the coordinates of an emitter in the image space and at the camera plane (i.e. the intersection of the Airy trajectory at $z_c$=0), respectively. In this scenario, the 3D volume of the image space can be retrieved as an inverse problem using the tomographic recordings on the camera. Accordingly, the 3D volume of the object space can be attained as (x, y)=(x', y')/M and z=z'/$M^2$, where M is the magnification of the wide-field imaging system.

Practically, the disclosed systems and methods can also employ two main strategies to obtain the optimum imaging performance of ATM. First, while essential for the non-diffracting and self-accelerating properties of the beam, the extended Airy side lobes can considerably degrade the image contrast and resolution in dense samples, preventing precise computational reconstruction. In this case, the disclosed technology can comprise a spatial filter (e.g., an additional phase modulation on the SLM) to suppress the Airy side lobes while preserving the property of the main lobe. Second, the curved trajectory of the Airy beam can be largely symmetric above and below the focal plane, causing ambiguity for volumetric reconstruction. To address this problem, the disclosed technology can comprise an additional phase chirp exp ($-ik_z \cdot z_0$), where $k_z = (k_x^2 + k_y^2)/(2k)$, and $z_0$ can empirically set from 1 μm to 10 μm, to control the ballistic trajectory of the Airy beam. The phase chirp can effectively elongate the unidirectional accelerating trajectory on one side of the focal plane to mitigate ambiguity.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates a system 100 for tomographic imaging. As shown, the system 100 can comprise a light source 110 configured to emit light from the light source to a sample 115. Additionally, the system 100 can comprise a spatial light modulator (SLM) 120 positioned between the light source 110 and the sample 115. The SLM 120 can also be positioned at a first angle laterally relative to the sample 115. In other words, the plane on which the sample 115 resides and the plane on which the SLM 120 resides can be parallel, and the SLM 120 can be rotatable and positioned at a first angle within that plane. It is also understood that, in some examples, the SLM 120 need not be parallel to the plane of the sample 115, and instead can be positioned at other angles.

Being between the light source 110 and the sample 115, the SLM 120 can interact with a beam of light as it is being emitted from the light source 110 and before it reaches the sample 115. The SLM 120 can therefore convert the beam of light to become an Airy beam. The SLM 120 can also make additional interactions with or modifications to the beam of light in addition to converting the light to an Airy beam. For instance, the SLM 120 can apply a Fourier transform to the beam of light, if the beam of light is in the form of a Gaussian beam. Alternatively, or additionally, the SLM 120 can modulate the Fourier transform by a cubic spatial phase. The Fourier transform and the cubic spatial phase can be represented by $A_0 \exp[-(k_x^2+k_y^2)/w_0]$ (the Fourier transform) modulated by the cubic spatial phase $(k_x/b_0)^3 + (k_y/b_0)^3$, where $a_0$, $b_0$, $w_0$ and $A_0$ are scale factors, and (x, y) and ($k_x$, $k_y$) are the spatial coordinates and the corresponding spatial-frequency components, respectively. The resulting Airy beam can have a two-dimensional exponentially truncated Airy function having the form $Ai(x/a_0, y/a_0)$, where $a_c$, is a scale factor, and (x,y) are the spatial coordinates.

Furthermore, the SLM 120 can comprise additional components or modulators. For example, the SLM 120 can include a spatial filter configured to suppress Airy side lobes of the Airy beam and a phase chirp configured to elongate an accelerating trajectory of the Airy beam such that the Airy beam is asymmetrical above and below the focal plane. The phase chirp can effectively elongate the unidirectional accelerating trajectory on one side of the focal plane to mitigate ambiguity. The phase chirp can have the form $\exp(-ik_z \cdot z_0)$, where $k_z = (k_x^2 + k_y^2)/(2k)$, and $z_0$ is empirically set to control a ballistic trajectory of the Airy beam. In some examples, $z_0$ can be from approximately 1 μm to approximately 10 μm (e.g., from 1 μm to 9 μm, from 1 μm to 8 μm, from 1 μm to 7 μm, from 1 μm to 6 μm, from 1 μm to 5 μm, from 1 μm to 4 μm, from 2 μm to 5 μm, or from 2 μm to 4 μm).

As described above, the SLM 120 can be positioned at a first angle laterally relative to the sample 115. In other words, the plane on which the sample 115 resides and the plane on which the SLM 120 resides can be parallel, and the SLM 120 can be rotatable and positioned at a first angle within that plane. It can be understood that changing the angle of the SLM 120 from a first angle to a second angle will alter the interaction that the light beam has with the SLM 120 and, therefore, with the sample 115. For example, if the Airy beam has an Airy main lobe on the focal plane (the plane on which the sample 115 resides), the Airy main lobe can be described as the form:

$$\begin{bmatrix} x_c \\ y_c \end{bmatrix} = \begin{bmatrix} 1 & 0 & A\cos(\Delta\varphi) \\ 0 & 1 & A\sin(\Delta\varphi) \end{bmatrix} \begin{bmatrix} x' \\ y' \\ z'^2 \end{bmatrix},$$

where (x', y', z') and ($x_c$, $y_c$) represent the coordinates of the light source in a space relative to the sample and a space relative to the detector, and $\Delta\varphi$ represents a difference between the first angle and the second angle. In such a manner, changing the angle of the SLM 120 and obtaining many interactions with different $\Delta\varphi$ can yield more coordinates and aid in the reconstruction of the sample 115 in a 3D volumetric space.

The system 100 can also comprise a controller 130. The controller can be configured to rotatably articulate the SLM 120 across a variety of angles relative to the sample 115. For example, the controller 130 can articulate the SLM 120 from the first angle to the second angle. As described above, the controller 130 can articulate the SLM 120 horizontally in a plane that is parallel to the focal plane (e.g., the plane in which the sample 115 resides). That is to say, the SLM 120 can rotate through a plurality of angles and orientations to change the interaction of the Airy beam with the sample 115. Alternatively, or additionally, the SLM 120 can be repositioned at angles vertically to skew the SLM 120. In other words, the controller 130 can transition the SLM 120 from a plane parallel to the focal plane to a plane at an angle to the focal plane.

The controller 130 can also alter the distance between angles, such as between the first angle and the second angle. Alternatively, or additionally, any given angle, therefore, can be a point on a continuous spectrum of configurations that are increasingly obtuse when compared to the first (original angle). The controller 130 can then slowly articulate the SLM 120 around through a 360° circle to capture images of the sample 115. In such an example, the difference between a given first angle and a given second angle would decrease, and the number of angles at which images are captured would increase. Such a gradually articulating/rotating configuration can provide for more precise imaging of the sample 115 and/or allow the system 100 to more precisely select a given angle.

Rather than having steadily rotating/articulating configuration, the controller 130 can be configured to the SLM 120 between a plurality of discrete states. For example, the plurality of states can include first angle and a second angle. The plurality of states can further include one or more intermediate angles at which the controller 130 pauses the SLM 120 to capture an image of the sample 115 before continuing the rotation. The plurality of angles, therefore, can provide a stepwise configuration of intermediate angles between the first angle and the second angle. For example, the plurality of angles can include a first angle at $\Delta\varphi=0$, a second angle at $\Delta\varphi=\pi$, and intermediate angles at $\pi/4$, $\pi/2$, and $3\pi/2$. It is to be understood that other stepwise configurations are contemplated, and that the controller 130 can articulate the SLM 120 through more or fewer discrete states. In some examples, the controller 130 can rotate the SLM 120 through a whole circle (e.g., $\Delta\varphi=2\pi$).

As shown, the system 100 can further comprise a detector 140. The detector 140 can capture images of the light beam interacting with the sample 115. For example, the detector 140 can comprise a camera, a microscope, or other such imaging device. The detector 140 can obtain perspective views of the sample 115 generated by the Airy beam interacting with the sample 115 on the focal plane (e.g., the plane on which the sample 115 resides). The detector 140 can also capture multiple other perspective views of the sample 115. That is to say, the detector 140 can capture a view of the sample 115 where each view corresponds to the SLM 120 being positioned at a different angle relative to the sample 115, as described above. The detector 140 can be in communication with the controller 130, and the controller 130 can process the data obtained by the detector 140.

In some examples, the controller 130 can comprise a processor 132 and a memory 134. The processor 132 and memory can store and/or execute instructions via the controller 130 to execute and/or implement some or all of the methods disclosed herein. The controller 130 can further include a storage device 136 and a display 138. The storage device 136 can aid in the storage of data obtained from the detector and/or instructions to be executed by the controller 130. The display 138 can allow for a user to make changes to the controller 130, obtain data, and store additional data.

Figure 2A:
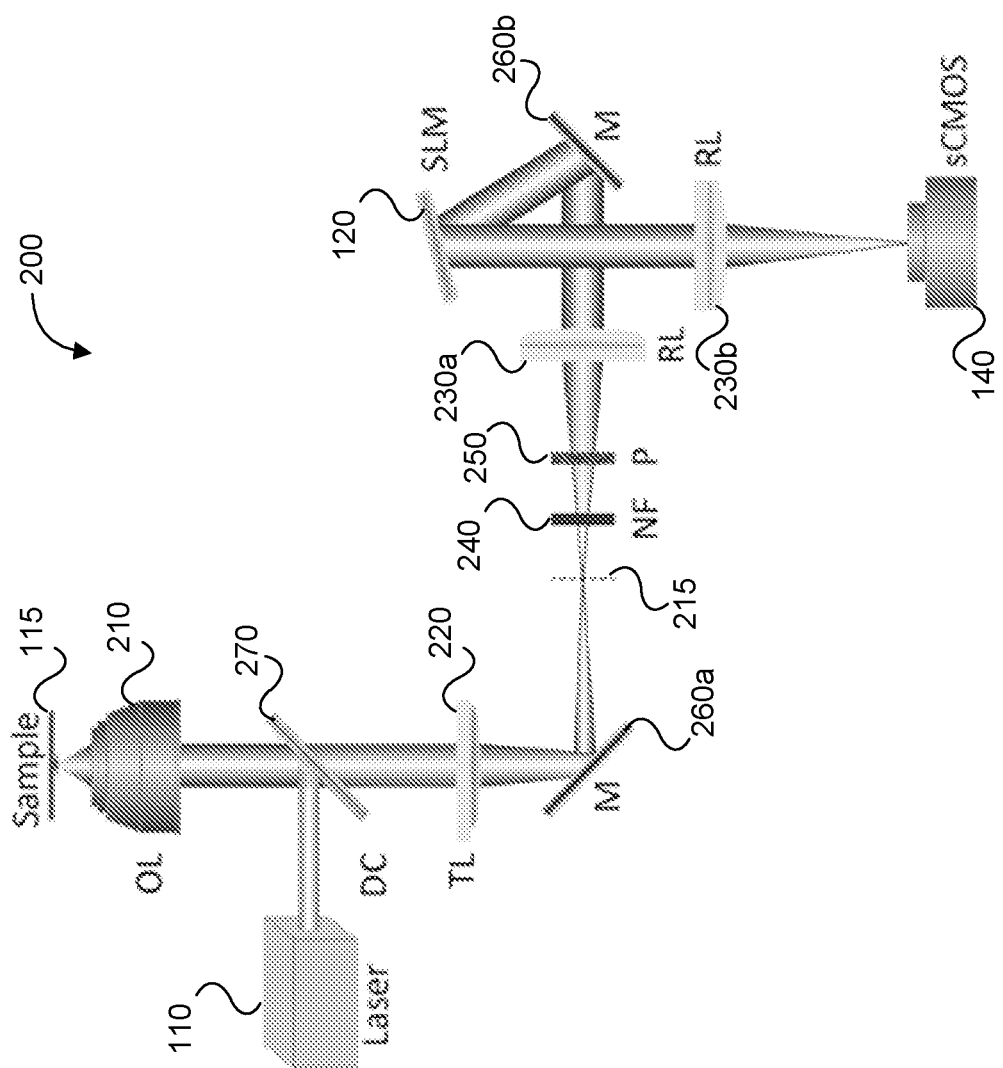
FIG. 2A illustrates another component diagram of a system for tomographic imaging in accordance with some embodiments of the present disclosure.
Figure 2B:
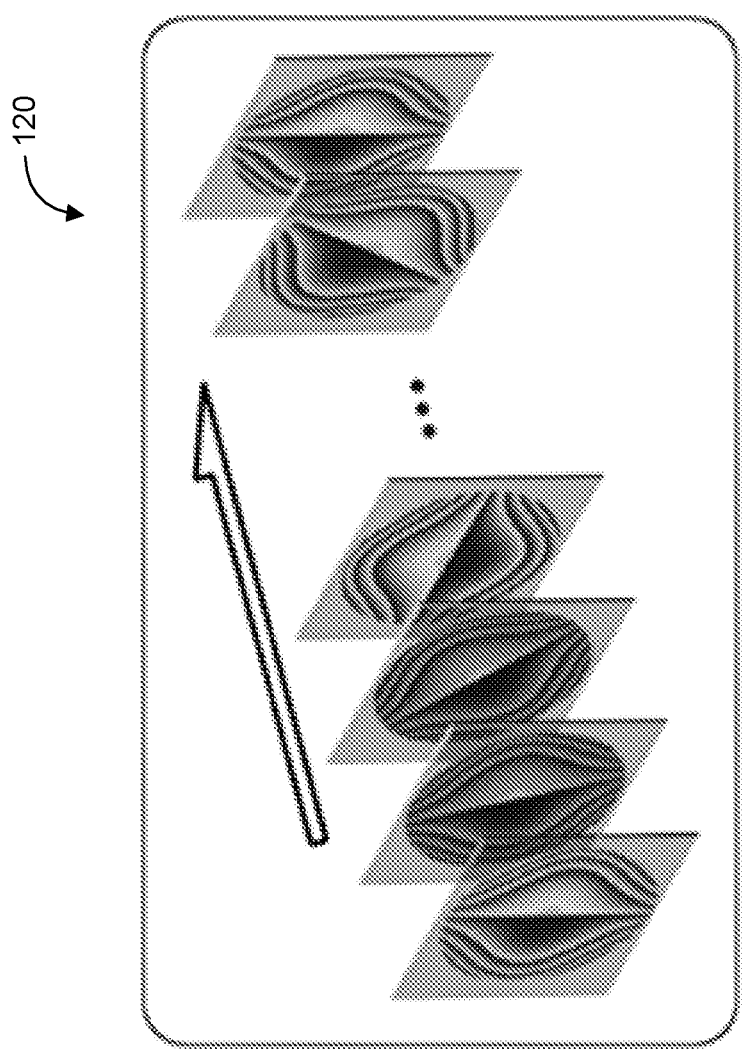
FIG. 2B illustrates an example of a spatial light modulator (SLM) in accordance with some examples of the present disclosure.

FIG. 2A shows another example of a system 200 for tomographic imaging. As shown, the system 200 can comprise an objective lens 210 and tube lens 220 to form an image of the sample 115 at the intermediate image plane 215, which can be relayed to the detector 140 by 4-f relay lenses 230a and 230b. The spatial light modulator (SLM) 120 can be situated at the Fourier plane of the relay lenses 230a and 230b such that the SLM 120 can impart phase modulation that converts the light into Airy beams. The system 200 can further comprise other components for aiding in modulating and/or accelerating the Airy beam to interact with the sample 115. For example, the system 200 can comprise a narrow-band filter 240, a polarizer 250, mirrors 260a and 260b, and/or a dichroic cube 270. FIG. 2B illustrates the varying phase masks on the SLM 120 that can steer the Airy trajectories to form perspective views.

While the following methods are described as being implemented and/or executed by the controller 130 and the system 100, it is understood that some or all of the methods described below, and/or portions of the methods described below can be executed by other components of the system 100, general purpose computers, computing devices, and the like.

Figure 3:
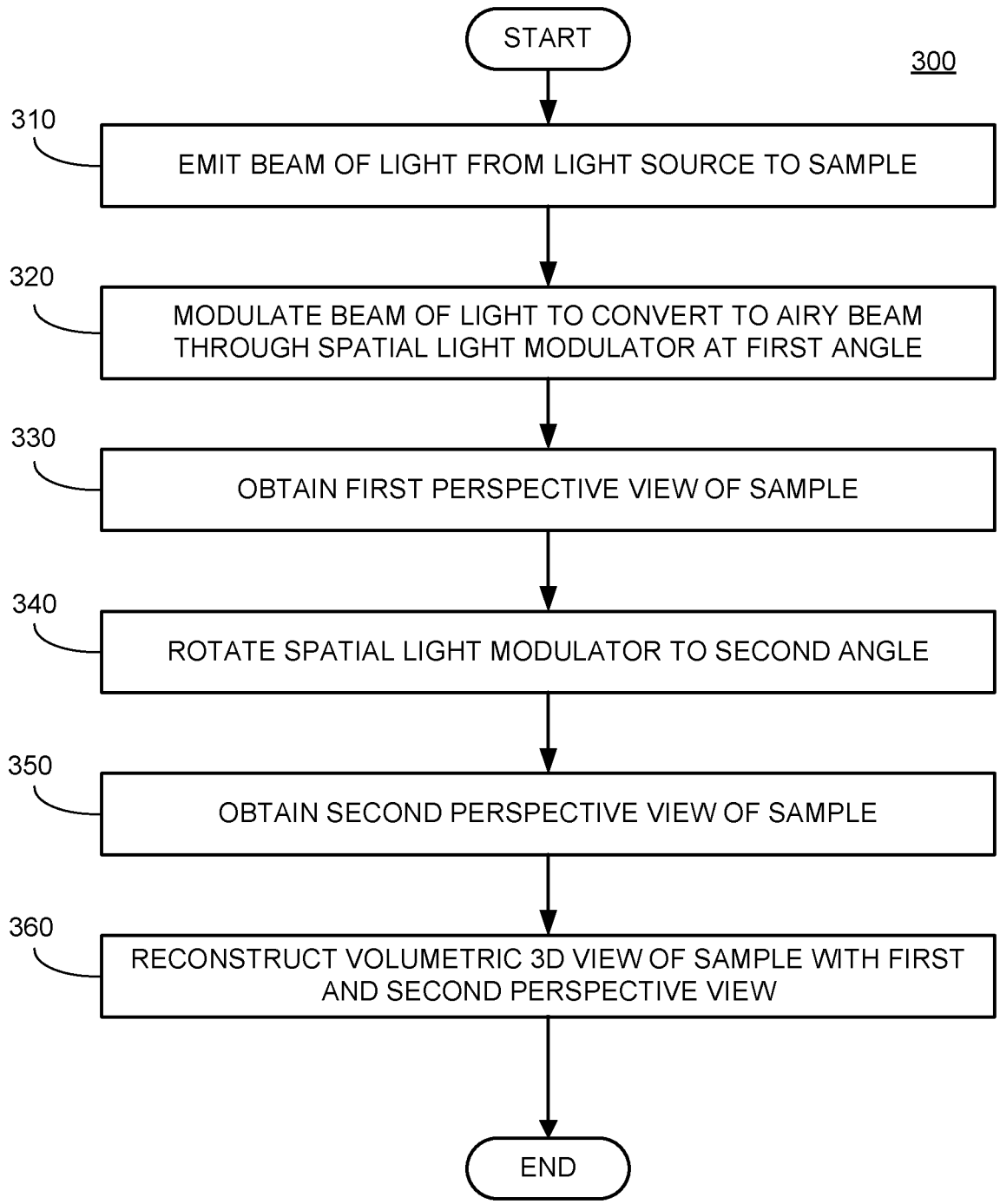
FIG. 3 illustrates a flowchart of an imaging method for tomographic imaging in accordance with some embodiments of the present disclosure.

FIG. 3 illustrates an imaging method 300. As shown in block 310, the system 100 can emit a beam of light from the light source 110 to the sample 115. As described above, the beam of light can comprise other beams, such as acoustic beams, ultrasound beams, and the like. The emitting of the beam of light can be continuous or noncontinuous. The light source 110 can also emit the beam of light in patterns over time. The method 300 can then proceed on to block 320.

In block 320, the SLM 120 can modulate the beam of light to convert the beam of light to an Airy beam. The SLM 120 can also apply a Fourier transform to the beam of light, if the beam of light is in the form of a Gaussian beam. Alternatively, or additionally, the SLM 120 can modulate the Fourier transform by a cubic spatial phase. Furthermore, the SLM 120 can comprise additional components or modulators. For example, the SLM 120 can include a spatial filter configured to suppress Airy side lobes of the Airy beam and a phase chirp configured to elongate an accelerating trajectory of the Airy beam such that the Airy beam is asymmetrical above and below the focal plane. The phase chirp can effectively elongate the unidirectional accelerating trajectory on one side of the focal plane to mitigate ambiguity.

The SLM 120 can also be positioned at a first angle relative to the sample 115. In other words, the plane on which the sample 115 resides and the plane on which the SLM 120 resides can be parallel, and the SLM 120 can be rotatable and positioned at a first angle within that plane. It is also understood that, in some examples, the SLM 120 need not be parallel to the plane of the sample 115, and instead can be positioned at other angles. The method 300 can then proceed on to block 330.

In block 330, the detector 140 can obtain a first perspective view of the sample 115. The first perspective view can be generated by the Airy beam interacting with the sample 115 on the focal plane (e.g., the plane on which the sample resides). The obtaining of the perspective view and the interaction of the Airy beam with the sample 115 are described throughout this disclosure. The method 300 can then proceed on to block 340.

In block 340, the system 100 (e.g., the controller 130) can rotate the SLM 120 such that the spatial light modulator is positioned at a second angle relative to the sample 115. The controller 130 can also alter the distance the first angle and the second angle. Alternatively, or additionally, any given angle, therefore, can be a point on a continuous spectrum of configurations that are increasingly obtuse when compared to the first (original angle). The controller 130 can further rotate the SLM 120 through one or more intermediate angles at which the controller 130 pauses the SLM 120 to capture an image of the sample 115 before continuing the rotation to the second angle. The plurality of angles, therefore, can provide a stepwise configuration of intermediate angles between the first angle and the second angle. The method 300 can then proceed on to block 350.

In block 350, the detector 140 can obtain a second perspective view of the sample 115. The second perspective view can be generated by the Airy beam interacting with the sample 115 on the focal plane (e.g., the plane on which the sample resides), and the second perspective view can be different from the first perspective view. Without wishing to be bound by any one scientific theory, it should be understood that the interaction of the SLM 120 with the beam of light at various angles can produce various perspective views of the sample 115. The obtaining of the perspective view and the interaction of the Airy beam with the sample 115 are described throughout this disclosure. The method 300 can then proceed on to block 360.

In block 360, the system 100 (e.g., the controller 130) can reconstruct a volumetric three-dimensional view of the sample 115 using the first perspective view and the second perspective view. The reconstructing can comprise deconvolving each of the first perspective image and the second perspective image using a corresponding Airy point-spread function for each. The method 300 can terminate after block 360. However, the method 300 can also return to any other block within the method 300 and/or to other method steps not shown.

Figure 4:
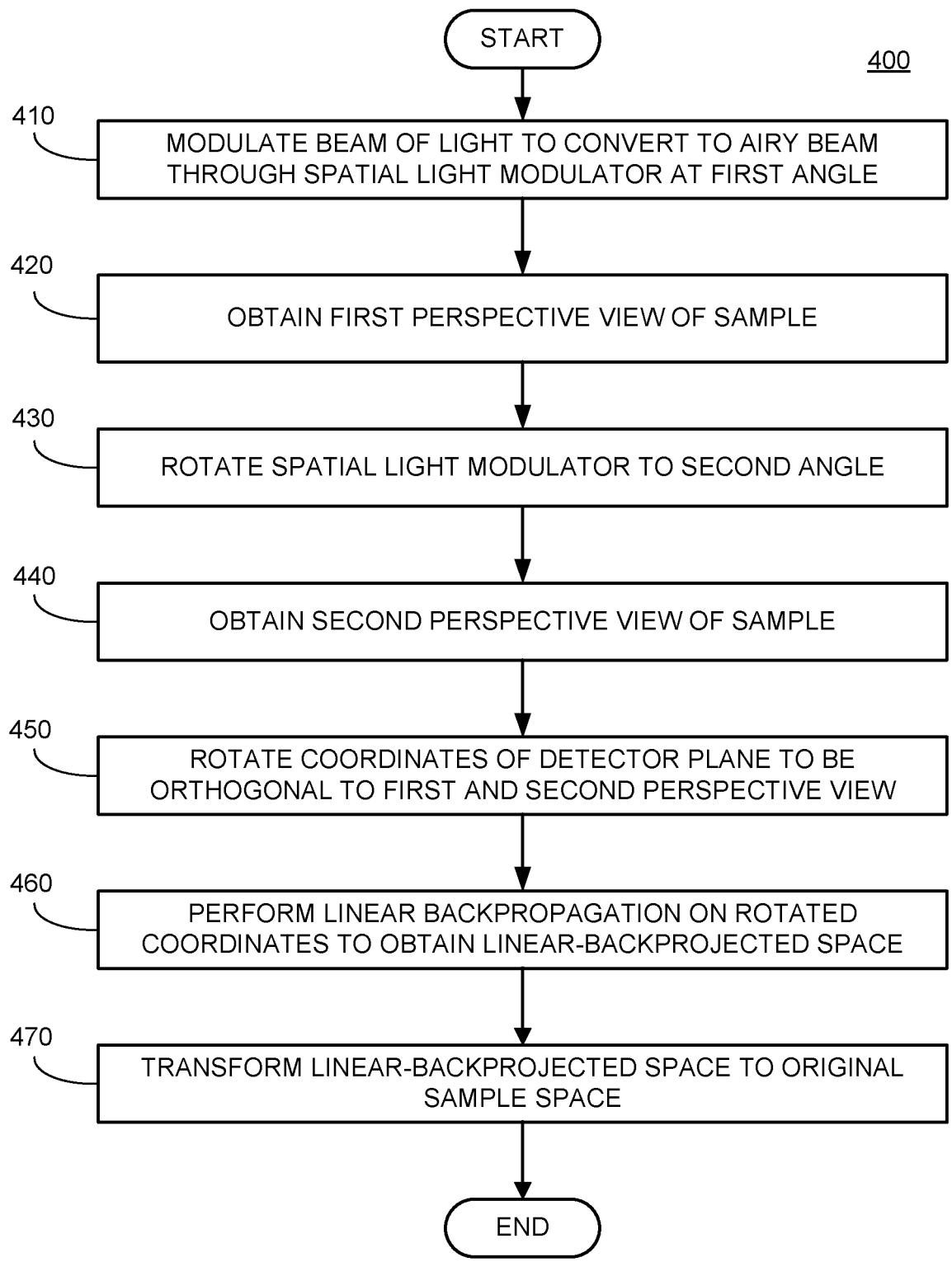
FIG. 4 illustrates a flowchart of another imaging method for tomographic imaging in accordance with some embodiments of the present disclosure.

FIG. 4 illustrates another imaging method 400. In block 410, the SLM 120 can modulate a beam of light to convert the beam of light to an Airy beam. The SLM 120 can also apply a Fourier transform to the beam of light if the beam of light is in the form of a Gaussian beam. Alternatively, or additionally, the SLM 120 can modulate the Fourier transform by a cubic spatial phase. Furthermore, the SLM 120 can comprise additional components or modulators. For example, the SLM 120 can include a spatial filter configured to suppress Airy side lobes of the Airy beam and a phase chirp configured to elongate an accelerating trajectory of the Airy beam such that the Airy beam is asymmetrical above and below the focal plane. The phase chirp can effectively elongate the unidirectional accelerating trajectory on one side of the focal plane to mitigate ambiguity.

The SLM 120 can also be positioned at a first angle relative to the sample 115. In other words, the plane on which the sample 115 resides and the plane on which the SLM 120 resides can be parallel, and the SLM 120 can be rotatable and positioned at a first angle within that plane. It is also understood that, in some examples, the SLM 120 need not be parallel to the plane of the sample 115, and instead can be positioned at other angles. The method 400 can then proceed on to block 420.

In block 420, the detector 140 can obtain a first perspective view of the sample 115. The first perspective view can be generated by the Airy beam interacting with the sample 115 on the focal plane (e.g., the plane on which the sample resides). The obtaining of the perspective view and the interaction of the Airy beam with the sample 115 are described throughout this disclosure. The method 400 can then proceed on to block 430.

In block 430, the system 100 (e.g., the controller 130) can rotate the SLM 120 such that the spatial light modulator is positioned at a second angle relative to the sample 115. The controller 130 can also alter the distance the first angle and the second angle. Alternatively, or additionally, any given angle, therefore, can be a point on a continuous spectrum of configurations that are increasingly obtuse when compared to the first (original angle). The controller 130 can further rotate the SLM 120 through one or more intermediate angles at which the controller 130 pauses the SLM 120 to capture an image of the sample 115 before continuing the rotation to the second angle. The plurality of angles, therefore, can provide a stepwise configuration of intermediate angles between the first angle and the second angle. The method 400 can then proceed on to block 440.

In block 440, the detector 140 can obtain a second perspective view of the sample 115. The second perspective view can be generated by the Airy beam interacting with the sample 115 on the focal plane (e.g., the plane on which the sample resides), and the second perspective view can be different from the first perspective view. Without wishing to be bound by any one scientific theory, it should be understood that the interaction of the SLM 120 with the beam of light at various angles can produce various perspective views of the sample 115. The obtaining of the perspective view and the interaction of the Airy beam with the sample 115 are described throughout this disclosure. The method 400 can then proceed on to block 450.

In block 450, the system 100 (e.g., the controller 130) can begin the reconstruction of the volumetric three-dimensional image of the sample, as described above. As shown, the controller 130 can rotate the coordinates of the plane of the detector 140 such that the plane is orthogonal with respect to each perspective view (e.g., the first perspective view and the second perspective view). The rotating can be defined by the relationship:

$$\begin{bmatrix} x_\perp \\ y_\perp \\ z_\perp \end{bmatrix} = A_{\varphi,\theta} \begin{bmatrix} x_c \\ y_c \\ z_c \end{bmatrix} = \begin{bmatrix} 1 & 0 & 0 \\ 0 & \cos\theta & \sin\theta \\ 0 & -\sin\theta & \cos\theta \end{bmatrix} \begin{bmatrix} \cos\varphi & \sin\varphi & 0 \\ -\sin\varphi & \cos\varphi & 0 \\ 0 & 0 & 1 \end{bmatrix} \begin{bmatrix} x_c \\ y_c \\ z_c \end{bmatrix}$$

where is the azimuthal orientation (at an integer number n of the step size of $\Delta\varphi$, i.e. $\varphi=n\cdot\Delta\varphi$, where $n \in \{0, 2\pi/\Delta\varphi-1\}$) of each perspective image on the plane of the detector, and $\theta$ represents the inclination angle with respect to the z axis. The method 400 can then proceed on to block 460.

In block 460, the controller 130 can perform a linear backpropagation on the rotated coordinates of the plane of the detector 140 to obtain linear-backprojected space coordinates. The linear backpropagation can comprise a parallel beam geometry and an iterative linear solver to obtain the linear-backprojected space coordinates. The method 400 can then proceed on to block 470.

In block 470, the controller 130 can then transform the linear-backprojected space coordinates to an original space containing the sample 115. To obtain the object space in such a manner, in practice, the perspective images of an object can be projected along the curved trajectories of Airy beams, in contrast to the conventional linear backpropagation scheme. The transformation of the linear-backprojected space coordinates can follow the form:

$$x = \frac{1}{M}x' = \frac{1}{M}x_T,$$

$$y = \frac{1}{M}y' = \frac{1}{M}y_T,$$

$$z = \frac{1}{M^2}z' = \frac{1}{M^2}(2\sqrt{2}\,k^2 x_0^3 z_T \tan\theta)^{1/2}$$

where M is the magnification of the imaging system. The method 400 can terminate after block 470. However, the method 400 can also return to any other block within the method 300 and/or to other method steps not shown.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXAMPLES

Example 1

All measurements can be performed on an epifluorescence microscope (Nikon Eclipse Ti-U) and a subsequent 4-f relay-optics system with a SLM (PLUTO-2-VIS-016 Reflective LCOS, Holoeye) placed on the Fourier plane, as shown in FIG. 2A. The SLM can have a refresh rate of 75 Hz. The microscope can utilize a 40×/0.75 NA objective lens (Plan-Fluor 40×/0.75 NA, Nikon) mounted beneath a three-axis nano-positioning system (I-3091, ASI), which can control the position of the sample. A polarizer can be used behind the image plane of the microscope to filter the fluorescence emission into polarized beams such that transmitted beams can be properly polarized for the SLM. The samples can be excited with three laser lines of 488 nm, 560 nm, and 647 nm (MPB). The emissions of Alexa Fluor 488 and Alexa Fluor 568 can additionally be filtered using narrow-band filters FF01-520/15 and FF01-600/14 bandpass emission filter (Semrock), respectively, to reduce the dispersion effect from the SLM. The images can be recorded by an sCMOS camera (Zyla 4.2, Andor).

Figure 5A:
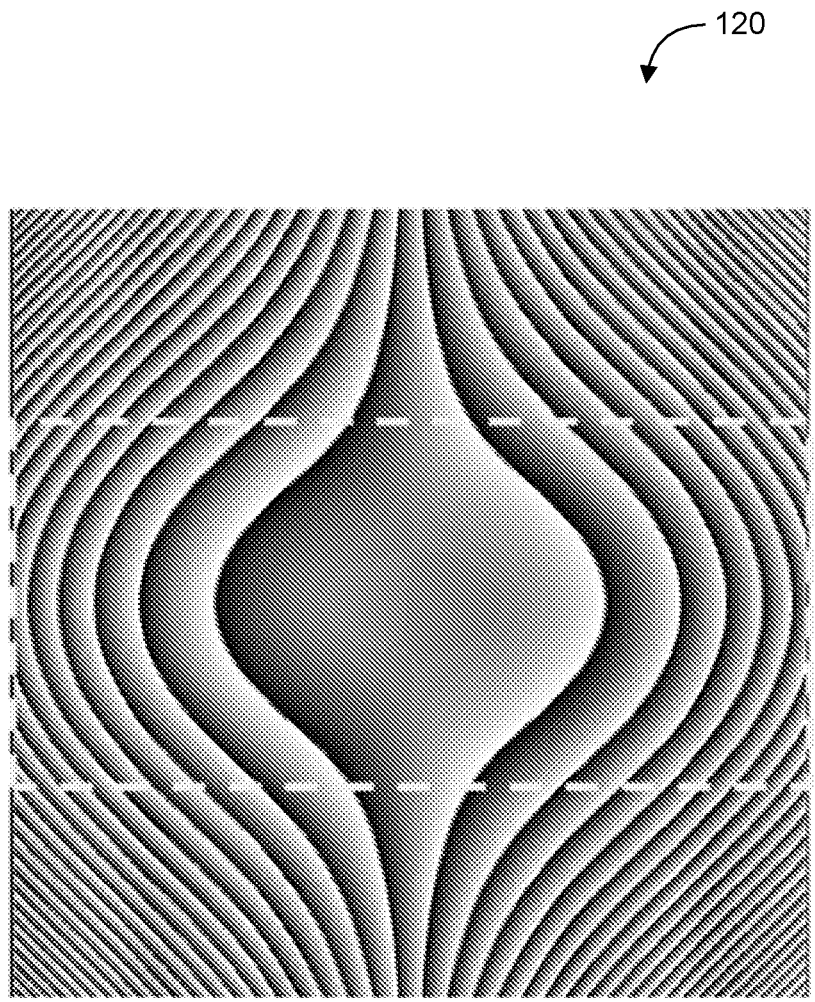
FIGS. 5A and 5B illustrate examples of another SLM for tomographic imaging in accordance with some embodiments of the present disclosure.
Figure 5B:
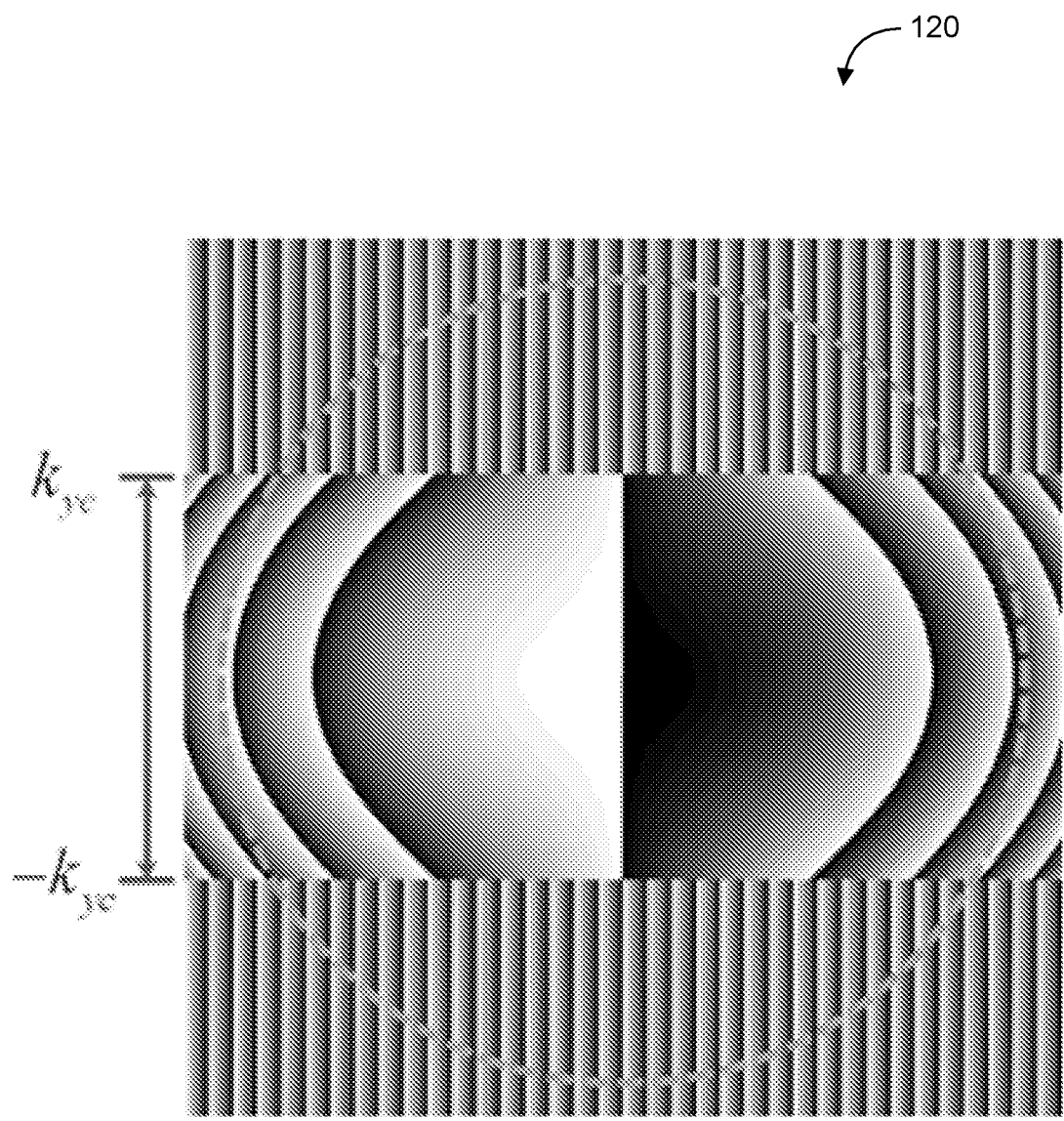

The design of the phase mask can be based on the consideration that a 2D finite-energy exponentially truncated Airy function is the Fourier transform of a Gaussian beam modulated by a cubic spatial phase. Therefore, the representation of the wave in the Fourier space (or the normalized k-space) can be described as $\Phi_0(k)=\exp(-ak^2)\exp(i/3(k^3-3a^2k-ia^3))$, where $k=2\pi n/\lambda_0$ is the wavenumber and a is the decay factor. In practice, the wave can be generated by the optical Fourier transform of a broad Gaussian incident beam modulated with a cubic phase using the SLM. Disclosed herein, the systems and methods can extend the apodized phase mask used in all the perspectives to suppress the side lobes for the entire set of the Airy beams. Examples of the phase mask are shown FIGS. 5A and 5B.

The phase modulation can respond differently to the two spectral channels. The systems and methods can perform a two-step registration to align different spectral channels using 200-nm fluorescent beams. First, the phase grating that separates the zeroth and first orders of diffraction can generate different translations for the two spectral images. The systems and methods can adjust this deviation using the separations between the zeroth and first order images. Second, as shown in the theoretical model $$\Delta l' = A z'^2 = \frac{1}{2\sqrt{2}\,k^2 x_0^3} z'^2,$$

the accelerating trajectory can be wavelength-dependent. Hence, the systems and methods can adjust the curved trajectory of one channel to align with the other in all the orientations. After registration, the images can be processed with the tomography algorithm to reconstruct the volumetric information.

Figure 6:
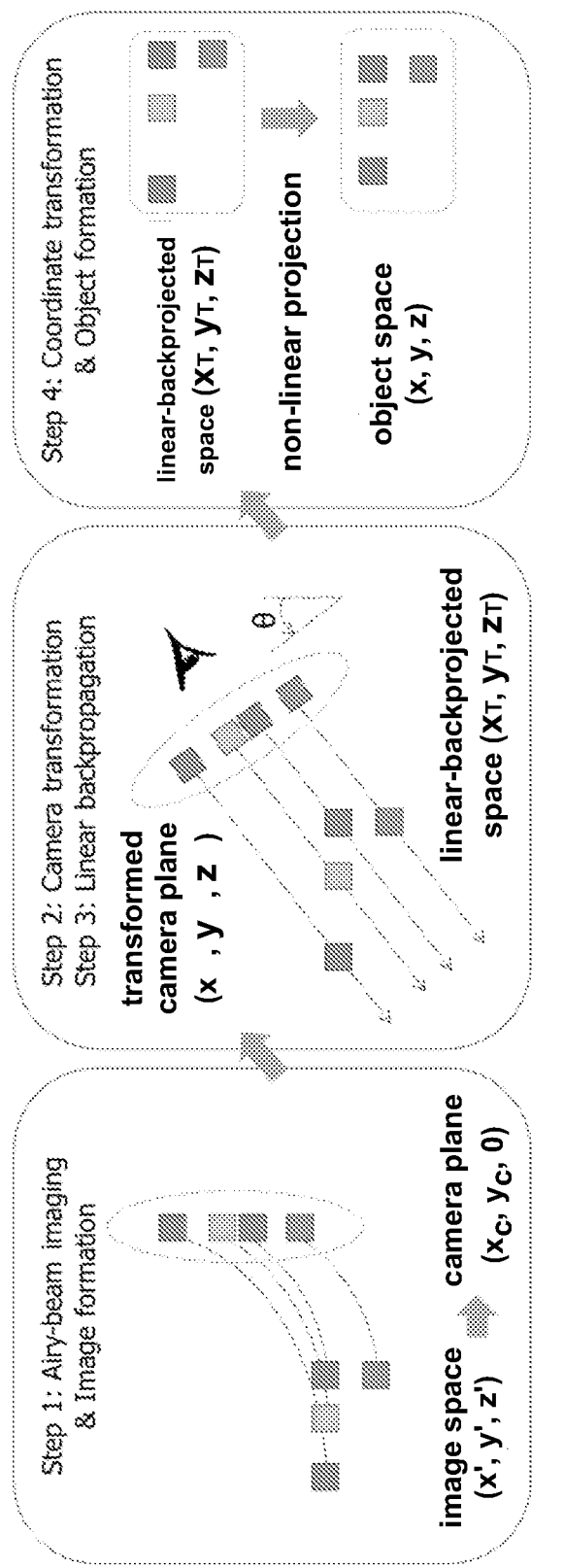
FIG. 6 illustrates a flowchart of a method for reconstructing a sample for tomographic imaging in accordance with some embodiments of the present disclosure.

The ATM algorithmic framework is illustrated in FIG. 6. In brief, the system can undergo four main steps to acquire and reconstruct the volumetric information of the object. In Step 1, the ATM can form perspective images of an object through Airy-beam imaging using self-accelerating trajectories.

Here, one can consider the fact that all the perspective images of the ATM can be recorded on a single planar camera sensor ($x_c$, $y_c$, $z_c=0$), distinct from those conventional tomographic reconstruction schemes using perspective acquisition (i.e. rotating or translating cameras perpendicular to each projection). Therefore, to utilize existing tomography algorithms that rely on linear backpropagation of perspective images, the system can perform Step 2 to rotate the coordinates so that the camera plane ($x_\perp$, $y_\perp$, $z_\perp$=0) is orthogonal with respect to each projection using the rotating relationship as:

$$\begin{bmatrix} x_\perp \\ y_\perp \\ z_\perp \end{bmatrix} = A_{\varphi,\theta} \begin{bmatrix} x_c \\ y_c \\ z_c \end{bmatrix} = \begin{bmatrix} 1 & 0 & 0 \\ 0 & \cos\theta & \sin\theta \\ 0 & -\sin\theta & \cos\theta \end{bmatrix} \begin{bmatrix} \cos\varphi & \sin\varphi & 0 \\ -\sin\varphi & \cos\varphi & 0 \\ 0 & 0 & 1 \end{bmatrix} \begin{bmatrix} x_c \\ y_c \\ z_c \end{bmatrix}$$

where φ is the azimuthal orientation (at an integer number n of the step size of Δφ, i.e. φ=n·Δφ, where n ∈ {0, 2π/Δφ−1}) of each perspective image on the original camera plane, and θ represents the inclination angle with respect to the z axis (FIG. 6). In practice, this inclination angle can be implemented to facilitate linear backpropagation of the perspective images, and can be fully corrected and restored to the original coordinate system in the final step of the algorithmic processing. Therefore, the value of θ can be empirically preset (here we used θ=π/6). Such an example can confirm consistent reconstruction using a value of θ ranging from approximately π/36 to approximately π/6.

Next, in Step 3, the system can perform linear backpropagation to reconstruct the 3D volume using the parallel beam geometry and the iterative linear solver LSQR in MATLAB, obtaining a linear-backprojected space of ($x_T$, $y_T$, $z_T$).

To obtain the object space, the system can consider the fact that in practice, the perspective images of an object can be projected along the curved trajectories of Airy beams, in contrast to the conventional linear backpropagation scheme. Therefore, the system can conduct a final Step 4 to transform the coordinates ($x_T$, $y_T$, $z_T$) back to the object space (x, y, z). As described above, the lateral displacement $$\Delta l' = Az'^2 = \frac{1}{2\sqrt{2}\,k^2 x_0'^3} z'^2,$$

and (x,y)=(x', y')/M and z=z'/$M^2$, where M is the magnification of the wide-field imaging system. As a result, the object coordinates can be obtained as:

$$x = \frac{1}{M}x' = \frac{1}{M}x_T,$$
$$y = \frac{1}{M}y' = \frac{1}{M}y_T,$$
$$z = \frac{1}{M^2}z' = \frac{1}{M^2}(2\sqrt{2}\,k^2 x_0'^3 z_T \tan\theta)^{1/2}.$$

Example 2

Figure 7A:
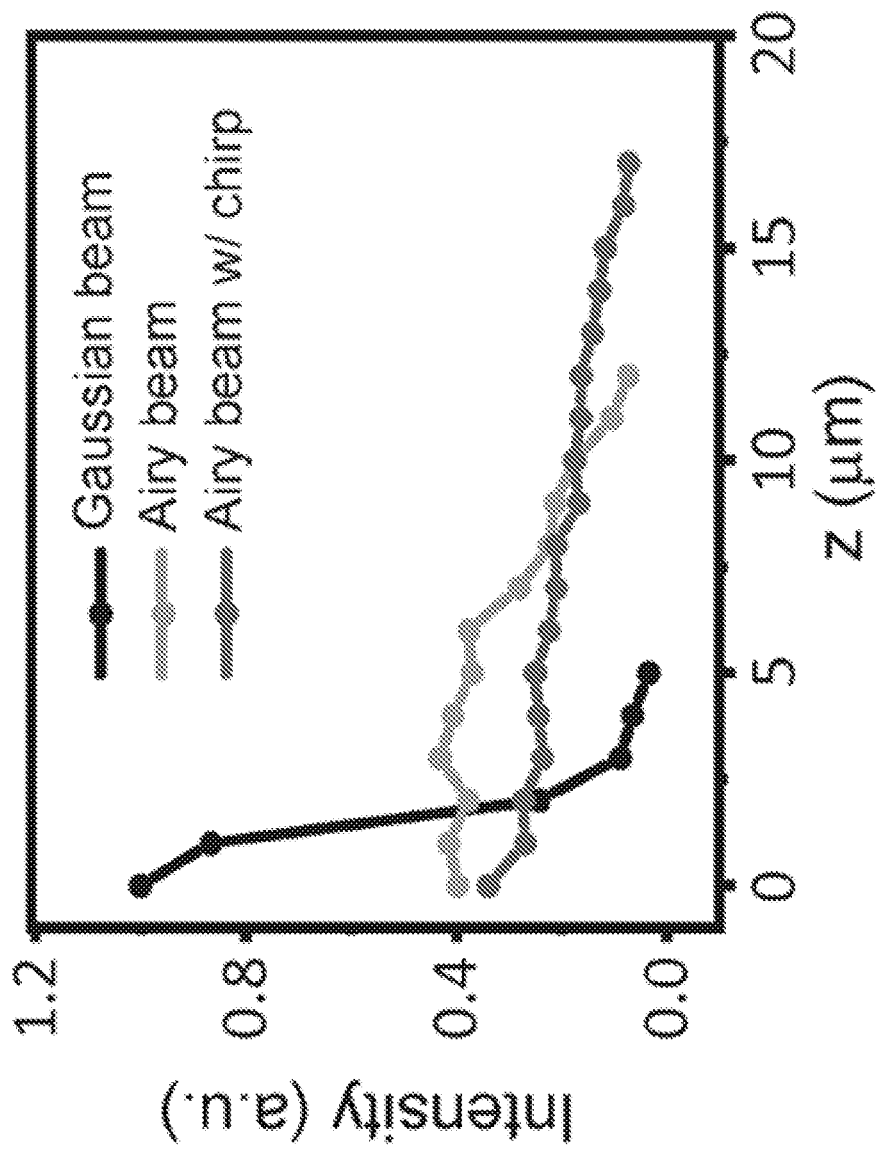
FIG. 7A illustrates the propagations of an Airy beam, and Airy beam with a phase chirp, and a Gaussian beam in accordance with some embodiments of the present disclosure.

200-nm dark-red fluorescent beads (T7280, ThermoFisher) can be tested and recorded to obtain their propagations using the original Gaussian (or Airy-disk to be exact), Airy, and chirped Airy beams at different axial positions (FIG. 7A). As measured on one side below the focal plane, the peak intensity of the Gaussian beam can exhibit an exponential decay with the half maximum at a depth of ~1-2 μm. Meanwhile, the Airy beam can maintain the profile and a relatively constant intensity up to a depth of ~6 μ, before noticeable decay. In contrast, the chirped Airy beam can exhibit minimum diffraction with moderate, linear decay across an axial range of more than 15 μm, close to an order of magnitude of improvement over the Gaussian beam.

Figure 7B:
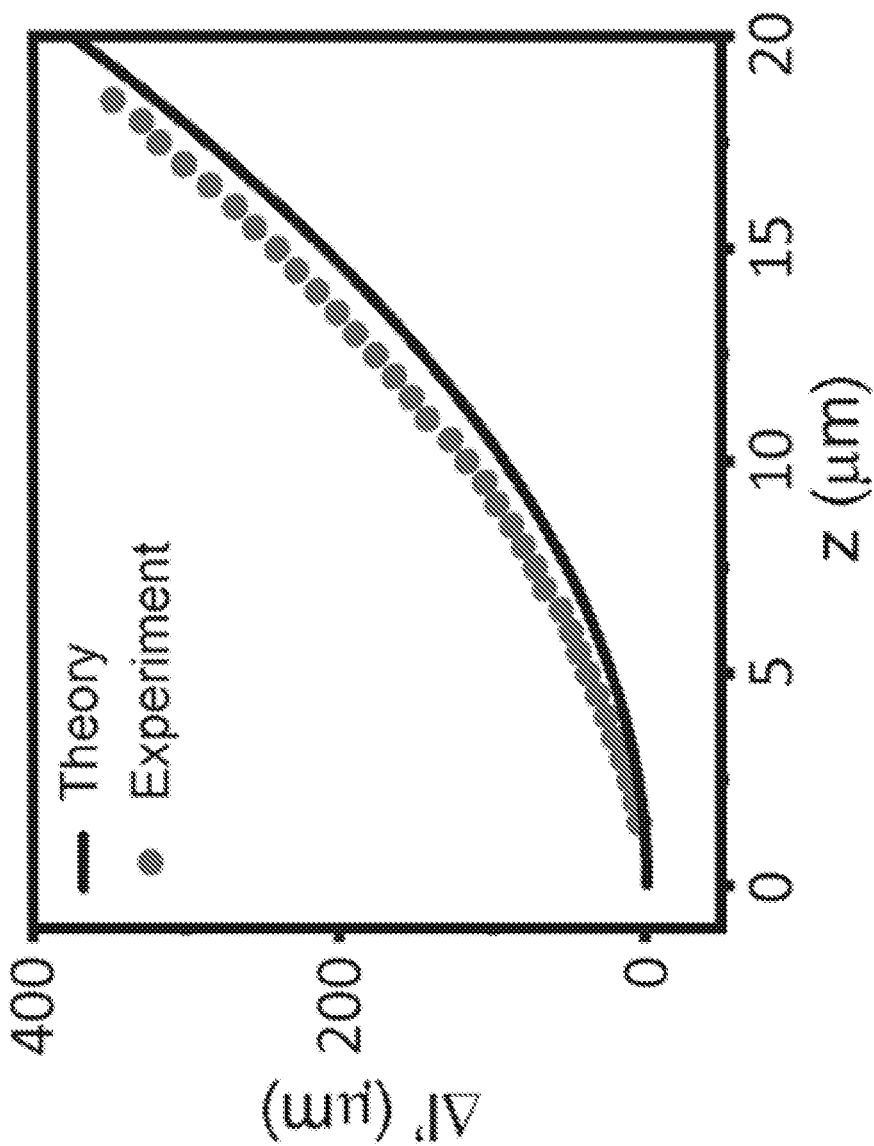
FIG. 7B illustrates a chart of the accelerating trajectory of a chirped Airy beam in accordance with some embodiments of the present disclosure.
Figure 7C:
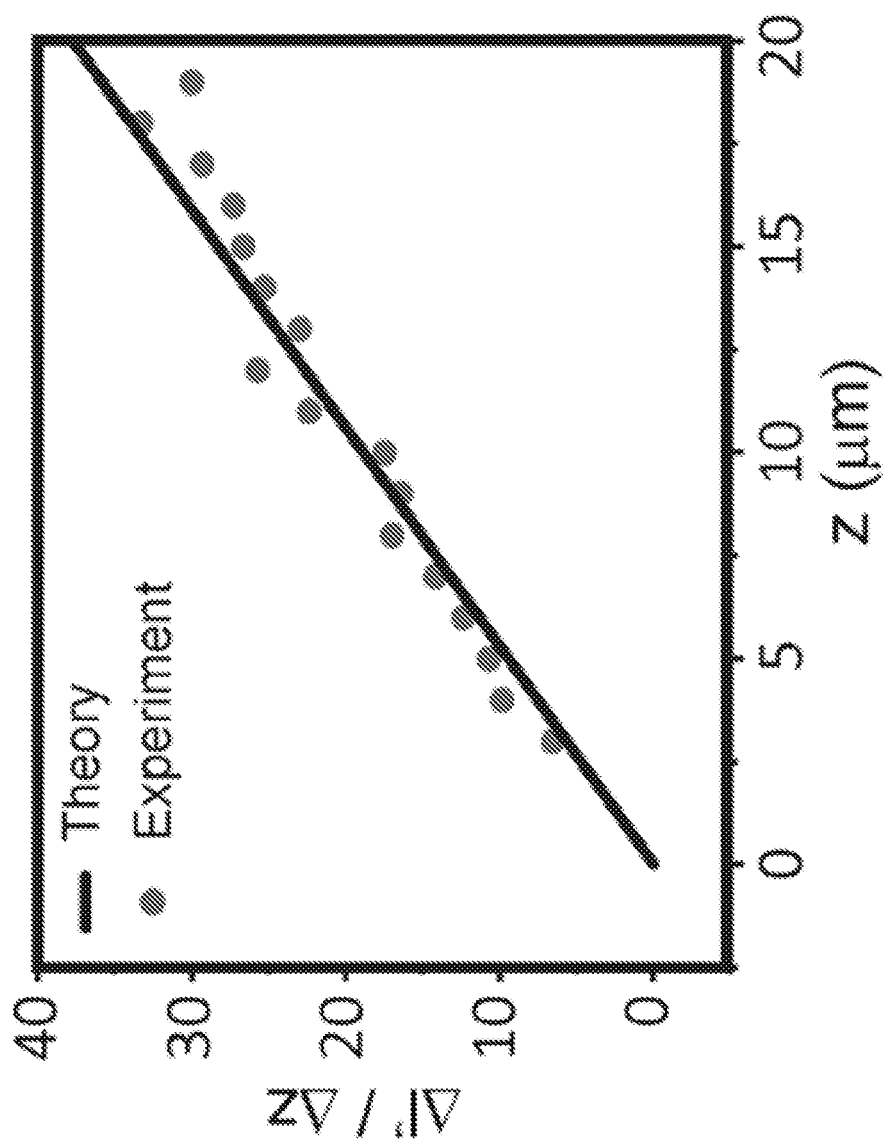
FIG. 7C illustrates a chart of the lateral displacement of a chirped Airy beam in accordance with some embodiments of the present disclosure.
Figure 8A:
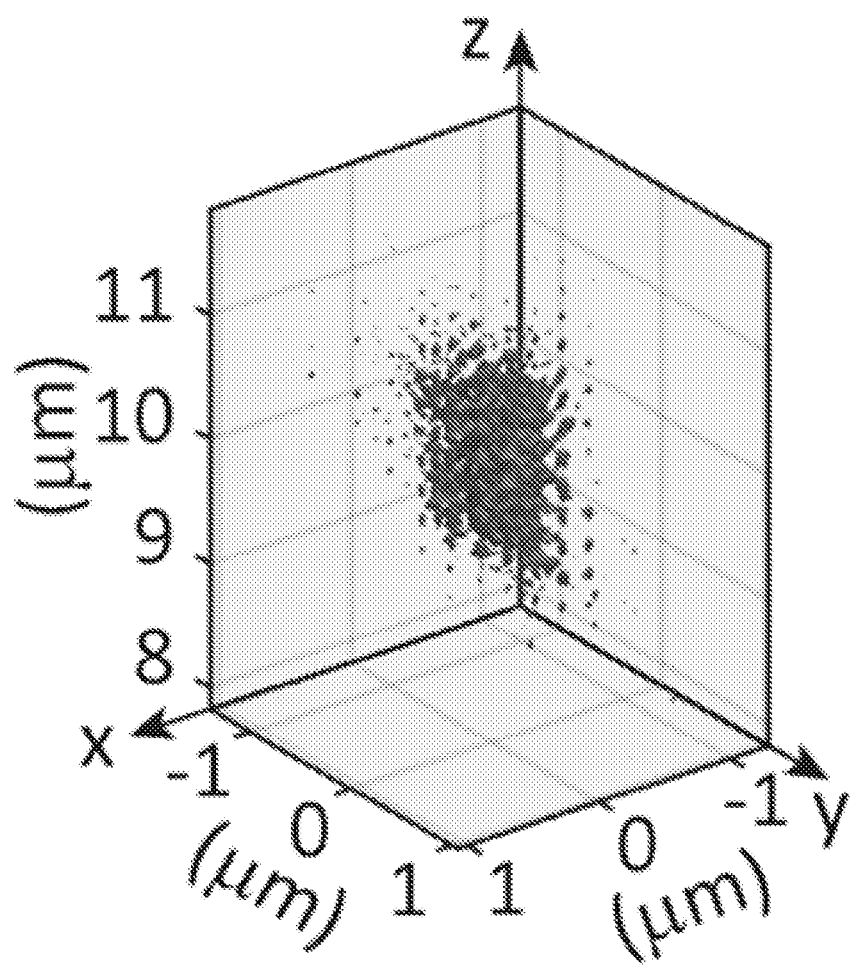
FIGS. 8A-D illustrate a 3D reconstruction, the cross-sectional profiles, and the full-width at half-maximum (FWHM) of a tomographically imaged sample in accordance with some embodiments of the present disclosure.
Figure 8B:
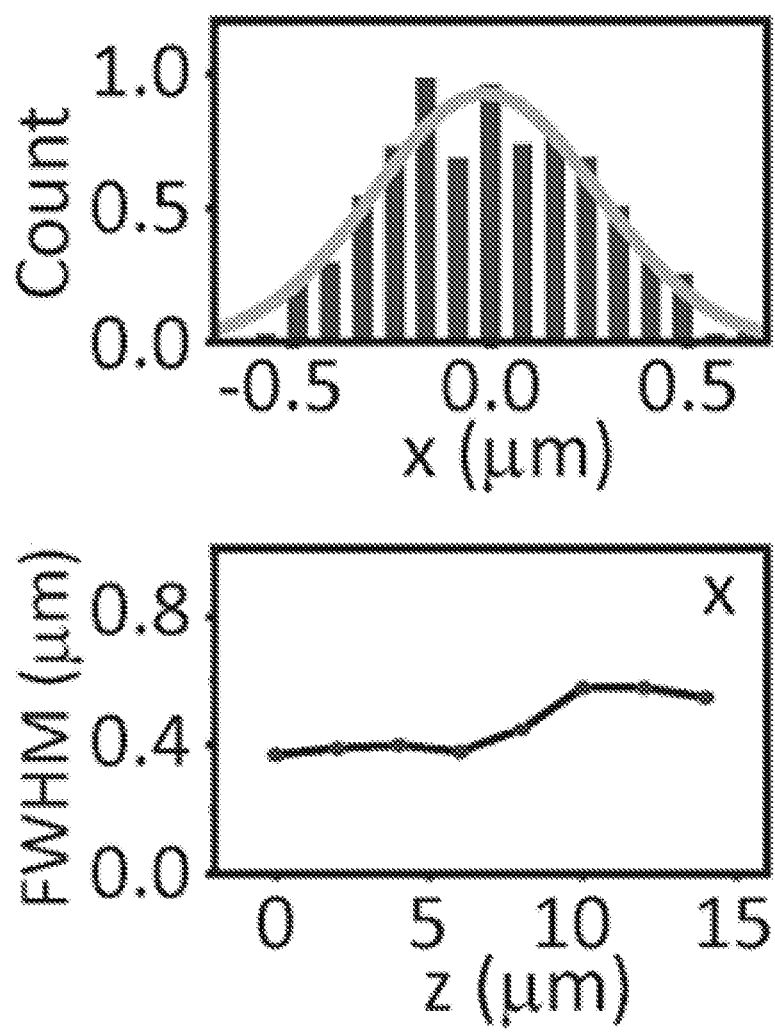
Figure 8C:
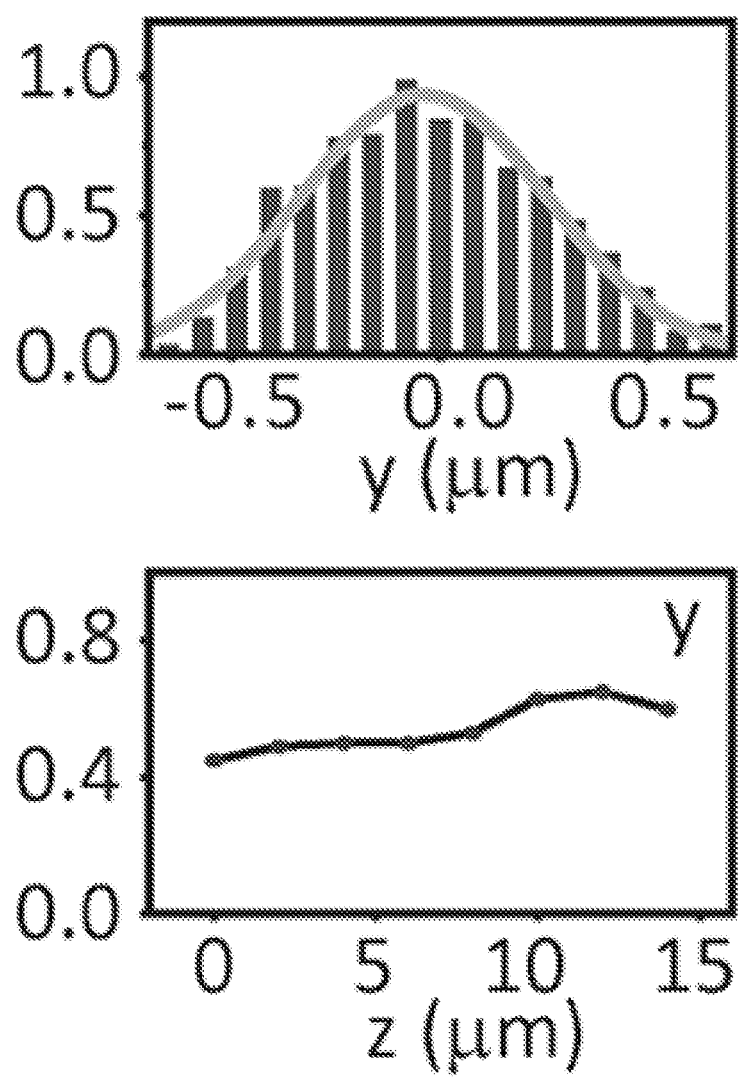
Figure 8D:
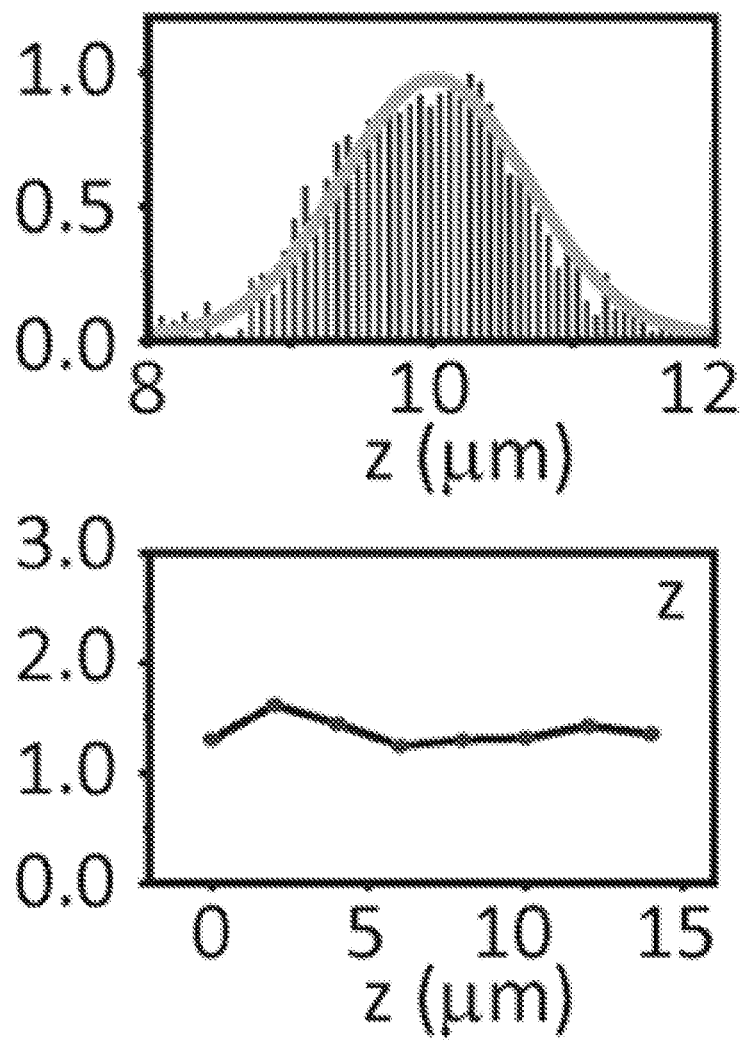
Figure 9A:
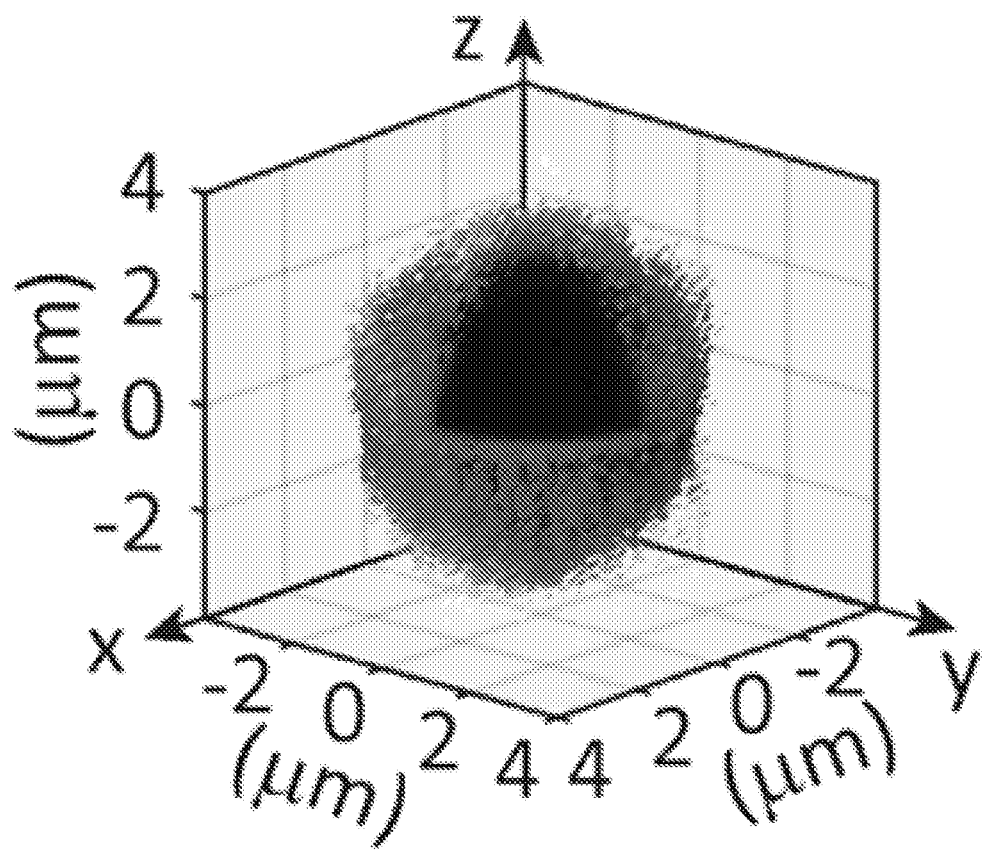
FIGS. 9A-D illustrate a 3D reconstruction and the cross-sectional profiles of another tomographically imaged sample in accordance with some embodiments of the present disclosure.
Figure 9B:
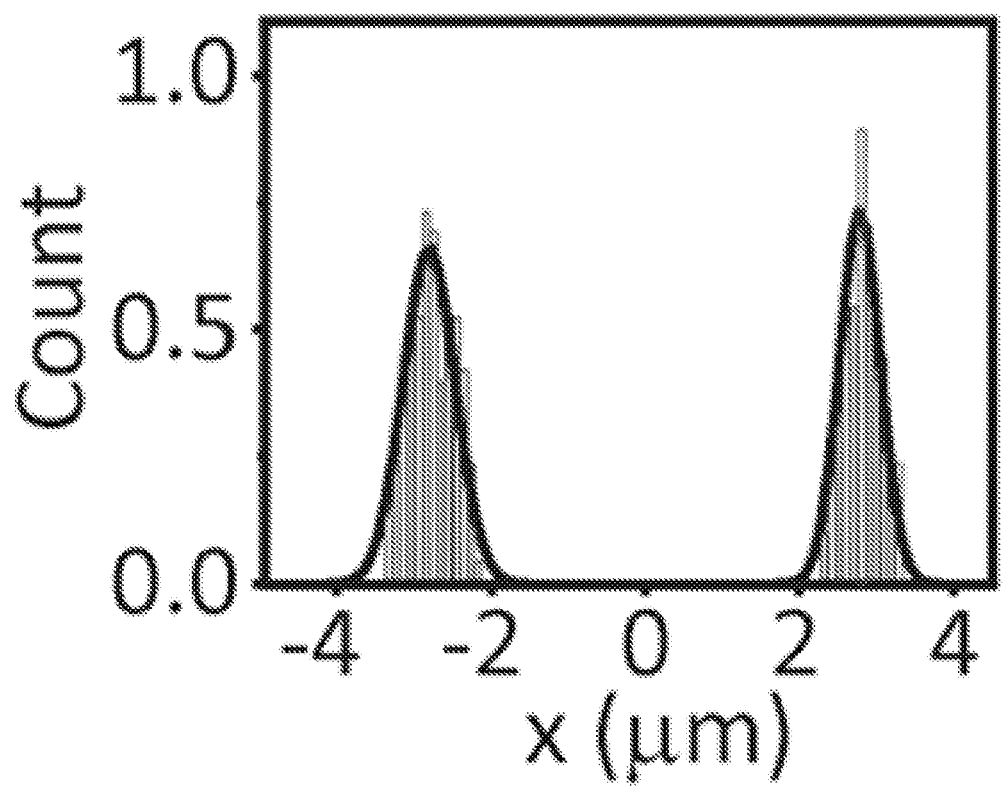
Figure 9C:
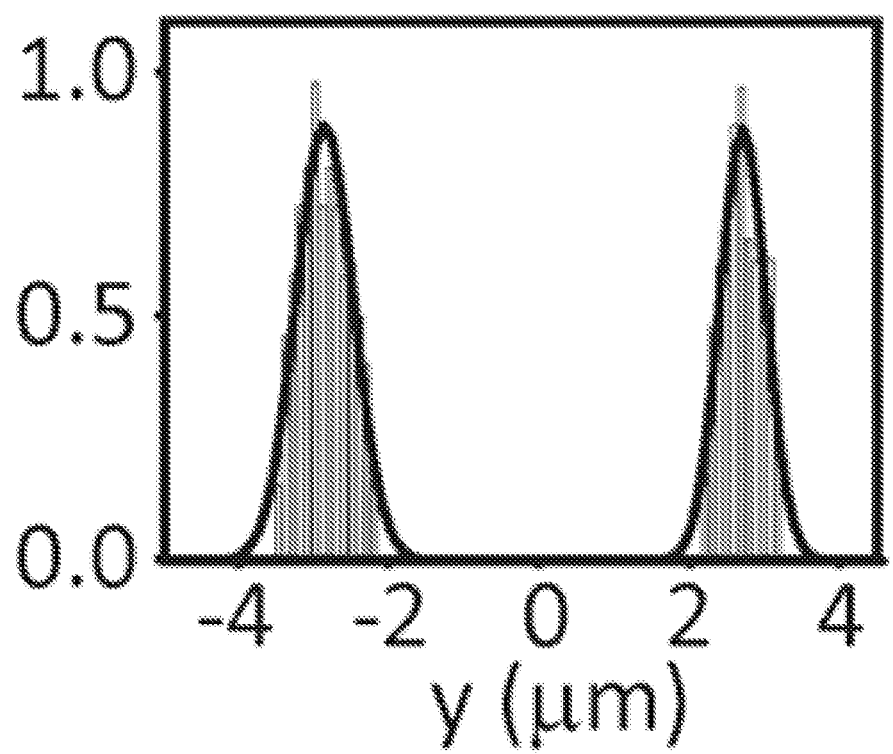
Figure 9D:
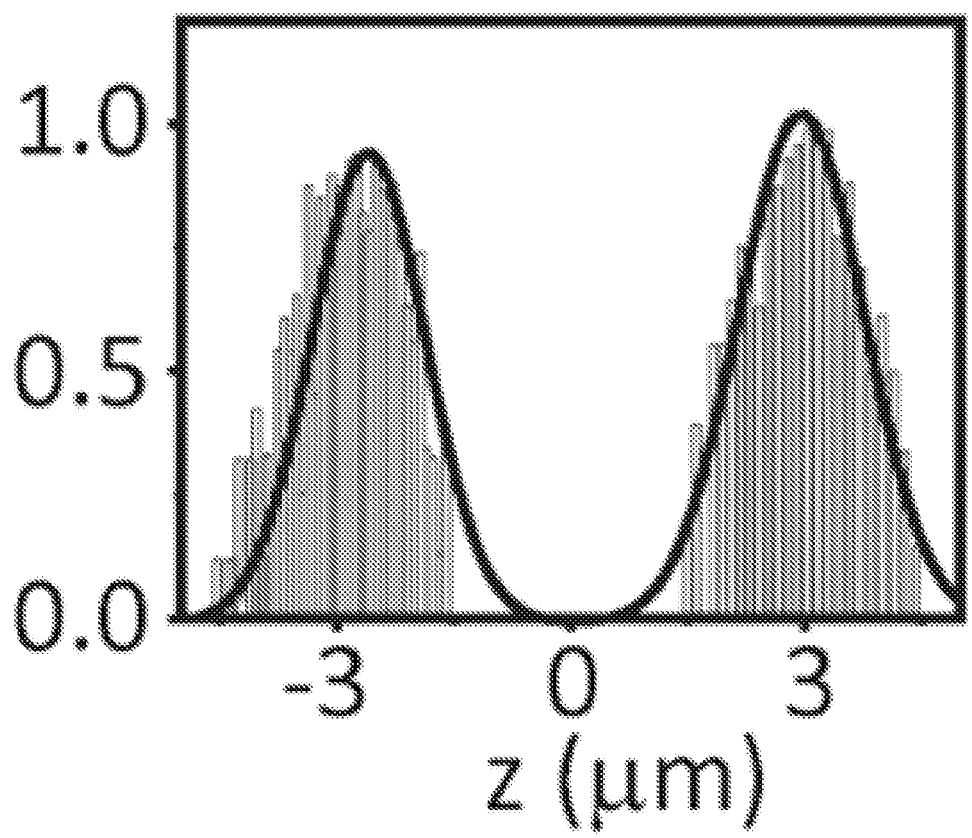
Figure 10A:
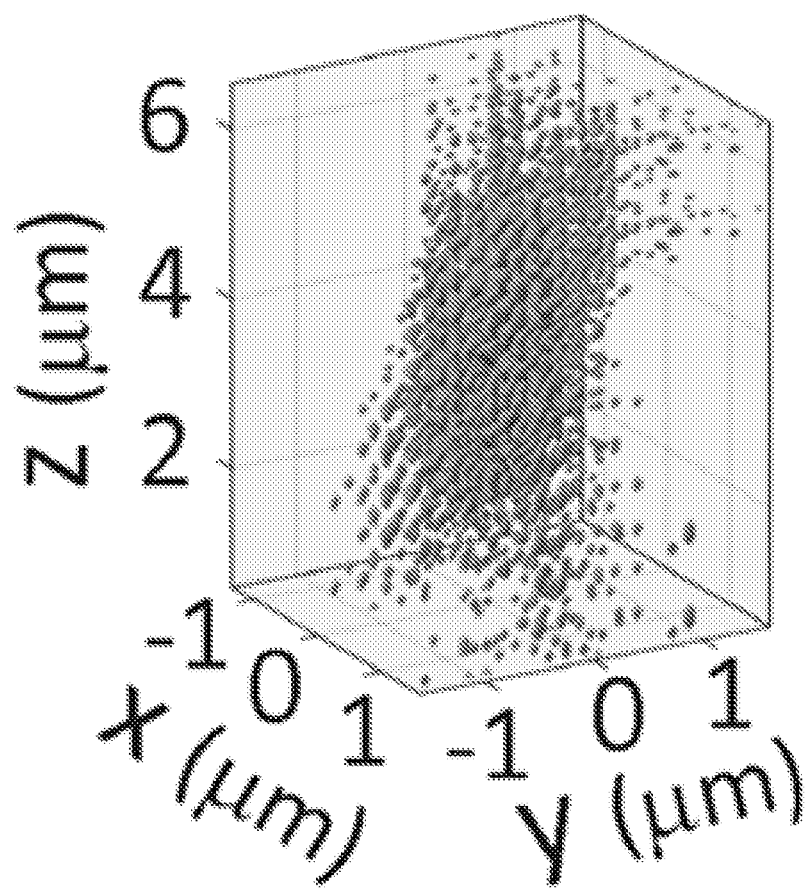
FIGS. 10A-D illustrate a 3D reconstruction and the cross-sectional profiles of another tomographically imaged sample in accordance with some embodiments of the present disclosure.
Figure 10B:
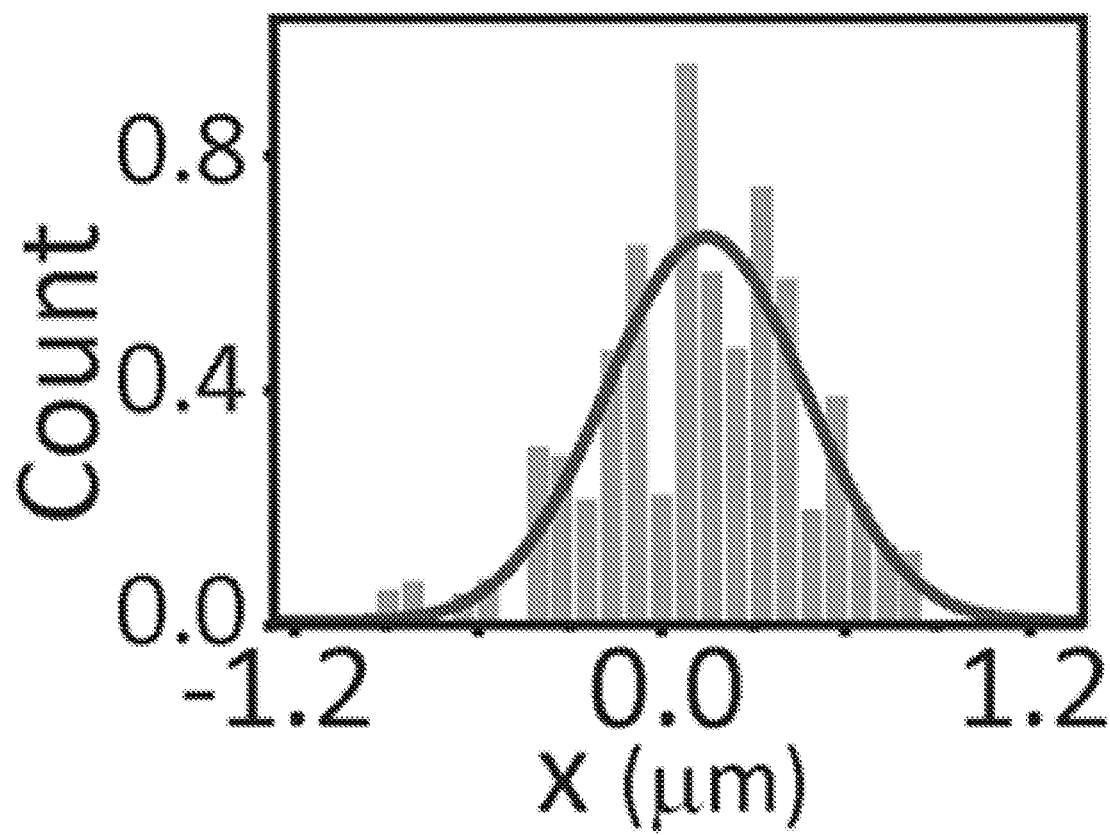
Figure 10C:
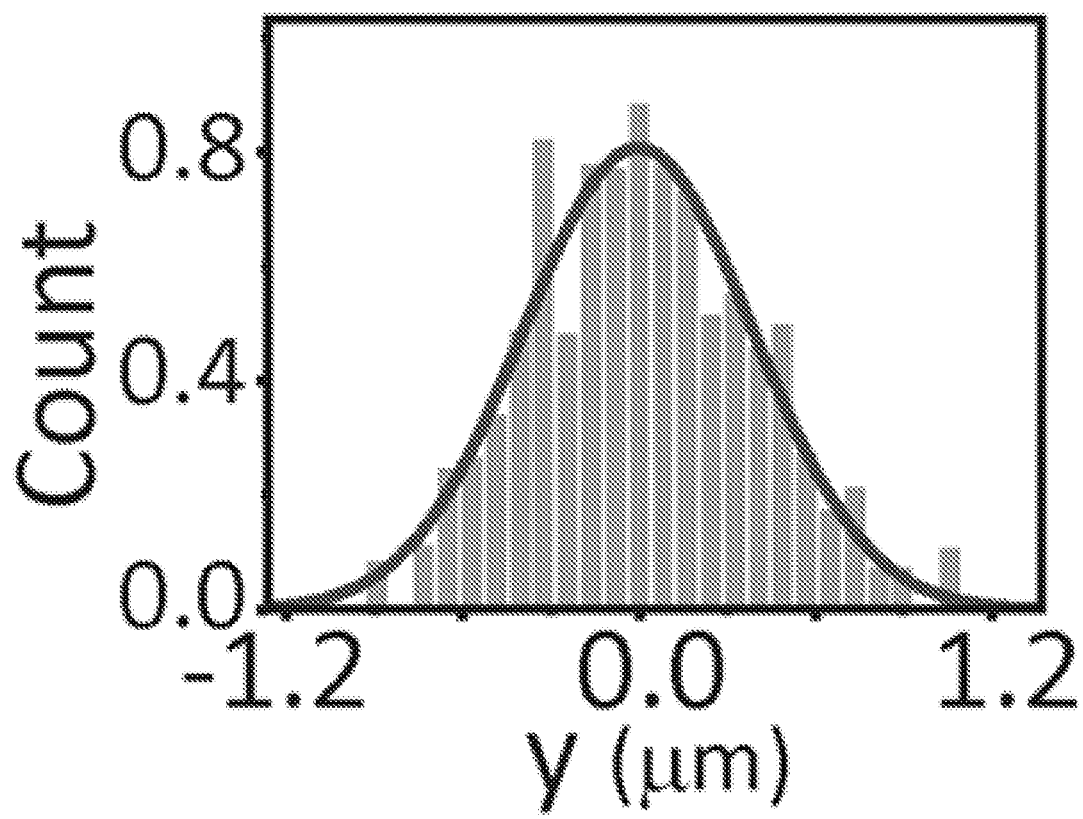
Figure 10D:
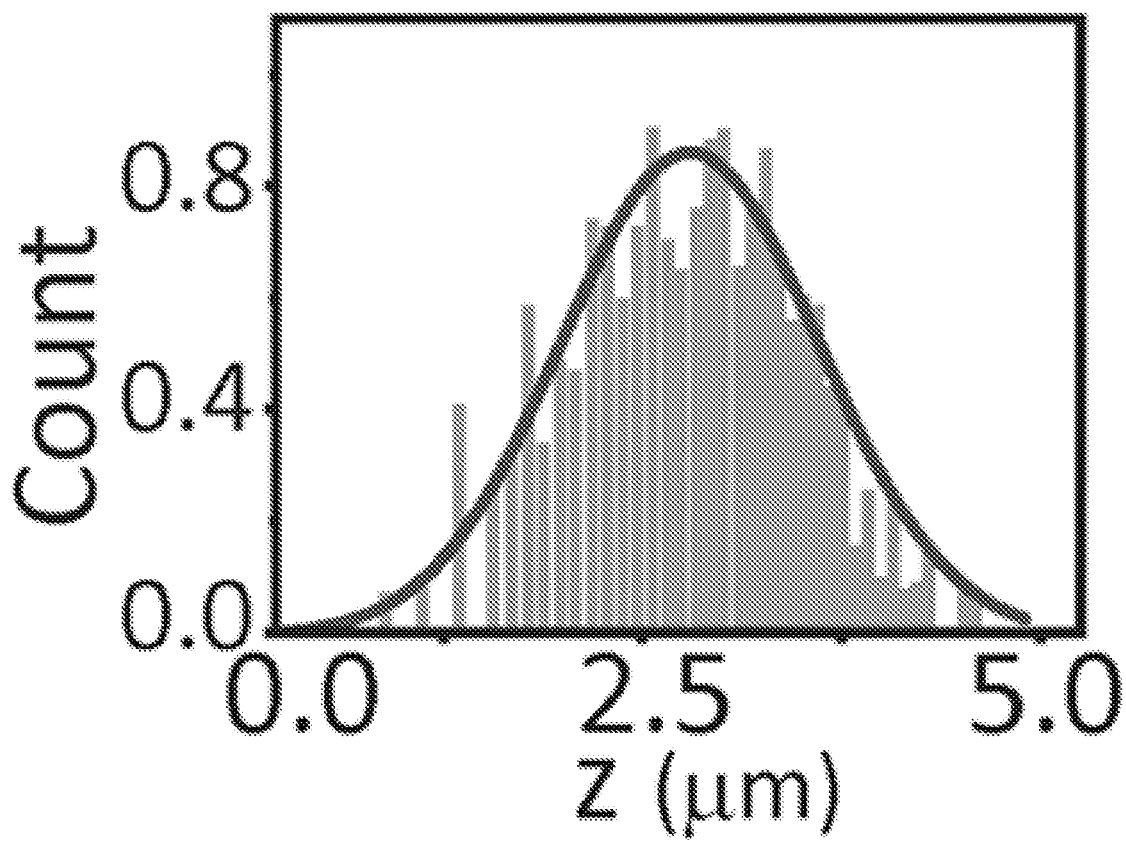

The accelerating trajectory of the chirped Airy beams can also be measured with respect to the axial positions (FIG. 7B). The experimental results can be fitted to a parabolic function Δl'=a(z+b)²+c with coefficients a=0.80, b=2.77 and c=−11.61. As seen, the accelerating property can be largely been preserved, and the slight deviation of the experimental data from the theoretical model (A=0.94 μm$^{-1}$) can be mainly due to the suppression of the side lobes and the use of the phase chirp. The accelerated lateral displacement Δl', as a result, can lead to a linearly enhanced axial sensitivity Δl'/Δz, effectively counteracting the moderate diffraction and thus maintaining consistent resolving power as the Airy beam propagates along the axial direction (FIG. 7C). Next, the perspective images of a 200-nm fluorescent bead can be recorded and overlaid with phase masks rotated by every Δφ=π/3, as well as at two different axial positions of 9 μm and 15 μm below the focal plane. As seen, the images of the Airy beams can be azimuthally oriented with respect to each Δφ, while the lateral displacements of the beams can be differentiated by the two axial positions. The average radii of the displacements of all the azimuthal orientations for the axial positions of 9 μm and 15 μm can be measured to be 104.7±4.4 μm and 241.9±6.2 μm in the image space, respectively, consistent with the respective values of 99.2 μm and 241.0 μm obtained from FIG. 7B.

Utilizing the perspective images, the 3D volume in the object space (x, y, z) can be reconstructed as an inverse problem using tomography algorithms. Using the 647-nm laser, the system can record 18 perspective images (Δφ=π/9) of 200-nm dark-red fluorescent beads and measured the 3D reconstructed images at varying depths (FIGS. 8A-D). The full-width at half-maximum (FWHM) values of these reconstructed images at each depth can be from 400 to 700 nm and ~1-2 μm in the lateral and axial dimensions, respectively, in agreement with the diffraction limit of ~450 nm and ~2 μm of the corresponding wide-field microscopy system. It is noticed that the FWHM values in y can be slightly larger than those in x, which is mainly due to the modest ellipticity of the Airy main lobe. As seen, these 3D FWHMs can be well maintained across an axial range close to 15 μm, exhibiting an order of magnitude of improvement in the DOF over wide-field microscopy. Consistent measurements can be obtained using 6, 9, 12, 18 and 36 perspective images. It should be noted that rotationally asymmetric or complex structures typically demand greater angular sampling.

To demonstrate the volumetric imaging capability of ATM, the system can image 200-nm fluorescent beads distributed in the 3D space of agarose gel. For better reconstruction quality without epi-fluorescent background, the system can deconvolve individual perspective images using their corresponding experimental Airy PSFs. As seen, the emitters located across an axial range of ~8 um can be reconstructed without the need for axial scanning. Notably, the perspective images of ATM can be readily interpretable in their raw format, due to the use of the engineered side-lobe-suppressed Airy beams. Therefore, the image quantification can remain consistent without deconvolution. The reconstructed images can exhibit FWHM values of 400-600 nm and 1.3-1.7 μm in the lateral and axial dimensions, respectively, agreeing with the measurements in FIGS. 8A-D. Furthermore, the system can image a surface-stained, 6-μm fluorescent microsphere (F14807, ThermoFisher), which the entire hollow structure was clearly resolved using ATM (FIGS. 9A-D). The corresponding lateral and axial cross-sectional profiles can exhibit the FWHM values of the stained surface at ~500-600 nm and 1-2 μm in the lateral and axial dimensions, respectively, in a good agreement with the measurements using 200-nm fluorescent beads (FIGS. 8A-D).

Lastly, the system can demonstrate ATM by imaging a mouse kidney tissue slice (F24630, ThermoFisher). The 16-μm cryostat section can be stained with Alexa Fluor 488 wheat germ agglutinin for elements of the glomeruli and convoluted tubules and with Alexa Fluor 568 phalloidin for filamentous actins in glomeruli and the brush border. Using the 488-nm laser, ATM can record the perspective views of the convoluted tubules, which can allow the system to reconstruct and computationally synthesize the focal stacks of a significant volume of >10 μm in thickness of the tissue slice without deconvolution and the need for sample or focal-plane scanning As seen, the lining of the tubules of sub-micrometer profiles in the lateral dimension and structural variations of a few micrometers across the DOF can be clearly visualized, consistent with the axial stacks taken by scanning wide-field microscopy. The system can then perform two-color ATM imaging of the proximal tubules using the 561-nm and 488-nm lasers. The two spectral channels can be first calibrated and registered using caliber markers to account for any deviations in the system or curved trajectories. Next, ATM can acquire the optical signals sequentially with the two lasers and reconstruct the volumetric object without deconvolution, showing a good agreement with the axial stacks recorded with scanning wide-field microscopy. As observed, the two-color images revealed the structural relationship, where the prominent actin bundles in the apical domain of the brush border are in close contact with the tubular structures. Furthermore, the profiles of individually separated tubular elements exhibited FWHM values of 600-800 nm and ~2 um in the lateral and axial dimensions, respectively, consistent with the measurements using the caliber structures (FIGS. 10A-D).

What is claimed is:

1. A method comprising:
    modulating a beam of light through a spatial light modulator configured to convert the beam of light to an Airy beam, the spatial light modulator being rotatable and positioned at a first angle relative to a sample;
    obtaining a first perspective view of the sample by a detector, the first perspective view being generated by the Airy beam interacting with the sample on a focal plane;
    rotating the spatial light modulator such that the spatial light modulator is positioned at a second angle relative to the sample;
    obtaining a second perspective view of the sample by the detector, the second perspective view being generated by the Airy beam interacting with the sample on the focal plane; and
    reconstructing a volumetric three-dimensional view of the sample using the first perspective view and the second perspective view;
    wherein the spatial light modulator comprises a spatial filter configured to suppress Airy side lobes of the Airy beam.

2. A method comprising:
    modulating a beam of light through a spatial light modulator configured to convert the beam of light to an Airy beam, the spatial light modulator being rotatable and positioned at a first angle relative to a sample;
    obtaining a first perspective view of the sample by a detector, the first perspective view being generated by the Airy beam interacting with the sample on a focal plane;
    rotating the spatial light modulator such that the spatial light modulator is positioned at a second angle relative to the sample;
    obtaining a second perspective view of the sample by the detector, the second perspective view being generated by the Airy beam interacting with the sample on the focal plane;
    rotating coordinates of a plane of the detector such that the plane is orthogonal with respect to each of the first perspective view and the second perspective view;
    performing a linear backpropagation on the rotated coordinates of the plane of the detector to obtain linear-backprojected space coordinates; and
    transforming the linear-backprojected space coordinates to an original space containing the sample.

3. The method of claim 1, wherein the spatial light modulator further comprises a phase chirp configured to elongate an accelerating trajectory of the Airy beam such that the Airy beam is asymmetrical above and below the focal plane.

4. The method of claim 3, wherein the phase chirp has the form $\exp(-ik_z \cdot z_0)$, where $k_z = (k_x^2 + k_y^2)/(2k)$, and $z_0$ is empirically set to control a ballistic trajectory of the Airy beam.

5. The method of claim 4, wherein $z_0$ is from approximately 1 μm to approximately 10 μm.

6. A method comprising:
    modulating a beam of light through a spatial light modulator configured to convert the beam of light to an Airy beam, the spatial light modulator being rotatable and positioned at a first angle relative to a sample;
    obtaining a first perspective view of the sample by a detector, the first perspective view being generated by the Airy beam interacting with the sample on a focal plane;
    rotating the spatial light modulator such that the spatial light modulator is positioned at a second angle relative to the sample;
    obtaining a second perspective view of the sample by the detector, the second perspective view being generated by the Airy beam interacting with the sample on the focal plane; and
    reconstructing a volumetric three-dimensional view of the sample using the first perspective view and the second perspective view;
    wherein the Airy beam has an Airy main lobe on the focal plane, the Airy main lobe described as the form:

$$\begin{bmatrix} x_c \\ y_c \end{bmatrix} = \begin{bmatrix} 1 & 0 & A\cos(\Delta\varphi) \\ 0 & 1 & A\sin(\Delta\varphi) \end{bmatrix} \begin{bmatrix} x' \\ y' \\ z'^2 \end{bmatrix};$$

and
    wherein:
    (x', y', z') and ($x_c$, $y_c$) represent coordinates of a light source emitting the light in a space relative to the sample and a space relative to the detector; and
    Δφ represents a difference between the first angle and the second angle.

7. A system for tomographic imaging comprising:
    a spatial light modulator being rotatable and positioned at a first angle relative to a sample, the spatial light modulator configured to convert a beam of light to an Airy beam;

a detector configured to obtain a first perspective view of the sample generated by the Airy beam interacting with the sample on a focal plane; and a controller configured to:
rotatably articulate the spatial light modulator such that the spatial light modulator is positioned at a second angle relative to the sample; and
reconstruct a volumetric three-dimensional view of the sample using the first perspective view;
wherein at least one of:
the spatial light modulator comprises a spatial filter configured to suppress Airy side lobes of the Airy beam;
the spatial light modulator comprises a phase chirp configured to elongate an accelerating trajectory of the Airy beam such that the Airy beam is asymmetrical above and below the focal plane; and
the Airy beam has an Airy main lobe on the focal plane, the Airy main lobe described as the form:

$$\begin{bmatrix} x_c \\ y_c \end{bmatrix} = \begin{bmatrix} 1 & 0 & A\cos(\Delta\varphi) \\ 0 & 1 & A\sin(\Delta\varphi) \end{bmatrix} \begin{bmatrix} x' \\ y' \\ z'^2 \end{bmatrix};$$

wherein:
(x', y', z') and ($x_c$, $y_c$) represent coordinates of a light source emitting the light in a space relative to the sample and a space relative to the detector; and
$\Delta\varphi$ represents a difference between the first angle and the second angle.

8. The system of claim 7, wherein the detector is further configured to, responsive to the controller rotatably articulating the spatial light modulator to the second angle, obtain a second perspective view of the sample generated by the Airy beam interacting with the sample on the focal plane.

9. The system of claim 8, wherein the controller is further configured to reconstruct the volumetric three-dimensional view of the sample using the second perspective view in addition to the first perspective view.

10. The system of claim 8, wherein the controller is further configured to deconvolve each of the first perspective image and the second perspective image using a corresponding Airy point-spread function for each.

11. The system of claim 7, wherein the spatial light modulator is configured to:
apply a Fourier transform to the beam of light, wherein the beam of light is in the form of a Gaussian beam; and
modulate the Fourier transform by a cubic spatial phase.

12. The system of claim 11, wherein the Fourier transform has the form $A_0 \exp[-(k_x^2 + k_y^2)/w_0]$, where $w_0$ and $A_0$ are scale factors, and (x, y) and ($k_x$, $k_y$) are spatial coordinates and corresponding spatial-frequency components, respectively.

13. The system of claim 11, wherein the cubic spatial phase has the form $(k_x/b_0)^3 + (k_y/b_0)^3$, where $b_0$ is a scale factor, and (x, y) and ($k_x$, $k_y$) are spatial coordinates and corresponding spatial-frequency components, respectively.

14. The system of claim 7, wherein the Airy beam is a two-dimensional exponentially truncated Airy function having the form $Ai(x/a_0, y/a_0)$, where $a_0$ is a scale factor, and (x, y) are spatial coordinates.

15. The system of claim 7, wherein the phase chirp has the form $\exp(-ik_z \cdot z_0)$, where $k_z = (k_x^2 + k_y^2)/(2k)$, and $z_0$ is empirically set to control a ballistic trajectory of the Airy beam.

16. The system of claim 15, wherein $z_0$ is from approximately 1 μm to approximately 10 μm.

17. An imaging method comprising:
modulating a beam of light through a spatial light modulator configured to convert the beam of light to an Airy beam, the spatial light modulator being rotatable and positioned at a first angle relative to a sample;
obtaining a first perspective view of the sample by a detector, the first perspective view being generated by the Airy beam interacting with the sample on a focal plane;
rotating the spatial light modulator such that the spatial light modulator is positioned at a second angle relative to the sample;
obtaining a second perspective view of the sample by the detector, the second perspective view being generated by the Airy beam interacting with the sample on the focal plane;
rotating coordinates of a plane of the detector such that the plane is orthogonal with respect to each of the first perspective view and the second perspective view;
performing a linear backpropagation on the rotated coordinates of the plane of the detector to obtain linear-backprojected space coordinates; and
transforming the linear-backprojected space coordinates to an original space containing the sample.

18. The method of claim 17, wherein the rotating is defined by the relationship:

$$\begin{bmatrix} x_\perp \\ y_\perp \\ z_\perp \end{bmatrix} = A_{\varphi,\theta} \begin{bmatrix} x_c \\ y_c \\ z_c \end{bmatrix} = \begin{bmatrix} 1 & 0 & 0 \\ 0 & \cos\theta & \sin\theta \\ 0 & -\sin\theta & \cos\theta \end{bmatrix} \begin{bmatrix} \cos\varphi & \sin\varphi & 0 \\ -\sin\varphi & \cos\varphi & 0 \\ 0 & 0 & 1 \end{bmatrix} \begin{bmatrix} x_c \\ y_c \\ z_c \end{bmatrix}$$

where $\varphi$ is the azimuthal orientation of each perspective image on the plane of the detector, and $\theta$ represents an inclination angle with respect to the z axis.

19. The method of claim 17, wherein the linear back-propagation comprises a parallel beam geometry and an iterative linear solver.

20. The method of claim 17, wherein the transforming the linear-backprojected space coordinates follows the form:

$$x = \frac{1}{M} x' = \frac{1}{M} x_{T'}$$
$$y = \frac{1}{M} y' = \frac{1}{M} y_{T'}$$
$$z = \frac{1}{M^2} z' = \frac{1}{M^2} (2\sqrt{2} k^2 x_0^3 z_T \tan\theta)^{1/2}$$

where M is a magnification of the imaging system.

21. The method of claim 17, wherein the modulating comprises:
applying a Fourier transform to the beam of light, wherein the beam of light is in the form of a Gaussian beam; and
modulating the Fourier transform by a cubic spatial phase.

22. The method of claim 21, wherein the Fourier transform has the form $A_0 \exp[-(k_x^2 + k_y^2)/w_0]$, where $w_0$ and $A_0$ are scale factors, and (x, y) and ($k_x$, $k_y$) are spatial coordinates and corresponding spatial-frequency components, respectively.

23. The method of claim 21, wherein the cubic spatial phase has the form $(k_x/b_0)^3 + (k_y/b_0)^3$, where $b_0$ is a scale factor, and (x, y) and ($k_x$, $k_y$) are spatial coordinates and corresponding spatial-frequency components, respectively.

24. The method of claim 17, wherein the Airy beam is a two-dimensional exponentially truncated Airy function having the form Ai(x/$a_0$,y/$a_0$), where $a_0$ is a scale factor, and (x, y) are spatial coordinates.

25. The method of claim 17, wherein the reconstructing comprises deconvolving each of the first perspective image and the second perspective image using a corresponding Airy point-spread function for each.

26. The method of claim 17, wherein the spatial light modulator comprises:
   a spatial filter configured to suppress Airy side lobes of the Airy beam; and
   a phase chirp configured to elongate an accelerating trajectory of the Airy beam such that the Airy beam is asymmetrical above and below the focal plane.

27. The method of claim 26, wherein the phase chirp has the form exp(−i$k_z$·$z_0$), where $k_z$=($k_x^2$+$k_y^2$)/(2k), and $z_0$ is empirically set to control a ballistic trajectory of the Airy beam.

28. The method of claim 27, wherein $z_0$ is from approximately 1 μm to approximately 10 μm.

29. The method of claim 17, wherein the Airy beam has an Airy main lobe on the focal plane, the Airy main lobe described as the form:

$$\begin{bmatrix} x_c \\ y_c \end{bmatrix} = \begin{bmatrix} 1 & 0 & A\cos(\Delta\varphi) \\ 0 & 1 & A\sin(\Delta\varphi) \end{bmatrix} \begin{bmatrix} x' \\ y' \\ z'^2 \end{bmatrix},$$

wherein (x', y', z') and ($x_c$, $y_c$) represent coordinates of a light source in a space relative to the sample and a space relative to the detector, and Δφ represents a difference between the first angle and the second angle.

* * * * *